(12) United States Patent
Yamada et al.

(10) Patent No.: US 9,605,414 B2
(45) Date of Patent: Mar. 28, 2017

(54) WORKING VEHICLE AND CONTROL METHOD THEREFOR

(71) Applicant: KOMATSU LTD., Tokyo (JP)

(72) Inventors: Kenichi Yamada, Fujisawa (JP); Masao Yoshizawa, Hiratsuka (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/889,200

(22) PCT Filed: Dec. 9, 2014

(86) PCT No.: PCT/JP2014/082549
§ 371 (c)(1),
(2) Date: Nov. 5, 2015

(87) PCT Pub. No.: WO2015/114954
PCT Pub. Date: Aug. 6, 2015

(65) Prior Publication Data
US 2016/0145836 A1 May 26, 2016

(30) Foreign Application Priority Data
Jan. 29, 2014 (JP) .................................. 2014-014214

(51) Int. Cl.
*E02F 9/22* (2006.01)
*E02F 9/20* (2006.01)
(Continued)

(52) U.S. Cl.
CPC ............ *E02F 9/2246* (2013.01); *B60K 6/387* (2013.01); *B60K 6/445* (2013.01); *B60W 10/06* (2013.01);
(Continued)

(58) Field of Classification Search
CPC .. B60K 2006/381; B60K 6/387; B60K 6/445; B60W 10/06; B60W 10/30;
(Continued)

(56) References Cited

U.S. PATENT DOCUMENTS 9,145,660 B2 * 9/2015 Peterson ............... E02F 9/2235
2009/0105028 A1 4/2009 Hiraki et al.
(Continued)

FOREIGN PATENT DOCUMENTS

JP 2006-63882 A 3/2006
JP 2006-329244 A 12/2006
(Continued)

OTHER PUBLICATIONS

The International Search Report for the corresponding international application No. PCT/JP2014/082549, issued on Mar. 10, 2015.
(Continued)

*Primary Examiner* — Tyler J Lee
(74) *Attorney, Agent, or Firm* — Global IP Counselors, LLP

(57) ABSTRACT

A transmission requirement setting unit sets a required traction force in a work vehicle based on an accelerator operation amount. A work implement requirement setting unit sets a required flow rate based on a work implement operation amount. An engine requirement setting unit determines the horsepower required based on the horsepower required by the transmission set based on the required traction force and the horsepower required by the work implement set based on the required flow rate. A required throttle setting unit determines a commanded throttle value based on the horsepower required. A pump displacement setting unit sets a target displacement for the hydraulic pump based on the required flow rate. The work implement requirement setting unit sets an upper limit for the required
(Continued)

flow rate to a prescribed flow rate limit value when the discharge pressure of the hydraulic pump is at or above a prescribed pressure threshold.

13 Claims, 16 Drawing Sheets

(51) Int. Cl.
| | | |
|---|---|---|
| *E02F 3/28* | (2006.01) | |
| *B60K 6/445* | (2007.10) | |
| *F02D 29/00* | (2006.01) | |
| *F02D 29/04* | (2006.01) | |
| *F15B 11/02* | (2006.01) | |
| *B60K 6/387* | (2007.10) | |
| *B60W 10/06* | (2006.01) | |
| *B60W 10/30* | (2006.01) | |
| *B60W 30/188* | (2012.01) | |
| *B60K 6/38* | (2007.10) | |
| *F02D 29/06* | (2006.01) | |

(52) U.S. Cl.
CPC ........ *B60W 10/30* (2013.01); *B60W 30/1886* (2013.01); *E02F 3/283* (2013.01); *E02F 9/202* (2013.01); *E02F 9/2066* (2013.01); *E02F 9/2235* (2013.01); *E02F 9/2253* (2013.01); *E02F 9/2289* (2013.01); *E02F 9/2292* (2013.01); *E02F 9/2296* (2013.01); *F02D 29/00* (2013.01); *F02D 29/04* (2013.01); *F15B 11/02* (2013.01); *B60K 2006/381* (2013.01); *F02D 29/06* (2013.01); *Y02T 10/6239* (2013.01)

(58) Field of Classification Search
CPC ..... B60W 30/1886; E02F 3/283; E02F 9/202; E02F 9/2066; E02F 9/2235; E02F 9/2246; E02F 9/2253; E02F 9/2289; E02F 9/2292; E02F 9/2296; F02D 29/00; F02D 29/04; F02D 29/06; F15B 11/02; Y02T 10/6239
USPC .......................................................... 701/50
See application file for complete search history.

(56) References Cited

U.S. PATENT DOCUMENTS

| | | | |
|---|---|---|---|
| 2012/0089288 A1* | 4/2012 | Kawashima ........... | B60K 6/485 701/22 |
| 2013/0000288 A1* | 1/2013 | Ho ........................ | E02F 9/2214 60/327 |
| 2013/0312397 A1 | 11/2013 | Callaway et al. | |
| 2014/0060020 A1* | 3/2014 | Peterson ................ | E02F 9/2235 60/327 |
| 2016/0032565 A1* | 2/2016 | Shimizu .................. | E02F 9/22 60/420 |

FOREIGN PATENT DOCUMENTS

| | | |
|---|---|---|
| JP | 2009-74405 A | 9/2007 |
| JP | 2011-47317 A | 3/2011 |
| JP | 2012-153174 A | 8/2012 |
| JP | 2012-158932 A | 8/2012 |
| JP | 2013-166482 A | 8/2013 |

OTHER PUBLICATIONS

The extended European search report for the corresponding European application No. 148804305, issued on Jan. 2, 2017.

* cited by examiner

WORKING VEHICLE AND CONTROL METHOD THEREFOR

CROSS-REFERENCE TO RELATED APPLICATIONS

This application is a U.S. National stage application of International Application No. PCT/JP2014/082549, filed on Dec. 9, 2014. This U.S. National stage application claims priority under 35 U.S.C. §119(a) to Japanese Patent Application No. 2014-014214, filed in Japan on Jan. 29, 2014, the entire contents of which are hereby incorporated herein by reference.

BACKGROUND

Field of the Invention

The present invention relates to a work vehicle and a control method therefor.

Background Information

Work vehicles are equipped with a relief valve for ensuring the discharge pressure from a hydraulic pump does not become excessive when a large load is applied to the work implement. The relief valve opens when the discharge pressure of the hydraulic pump increases and reaches a prescribed relief pressure. Relieving a portion of the hydraulic fluid discharged from the hydraulic pump thusly prevents excessive increases in the discharge pressure of the hydraulic pump.

However, the energy from the hydraulic fluid relieved via the relief valve is converted to heat, and therefore that energy is lost. Accordingly, from the view of preventing energy loss, the discharge flow rate from the hydraulic pump should be kept as small as possible during relief.

In this regard, the work vehicle disclosed in Japanese Unexamined Patent Application Publication No. 2009-074405 limits the engine rotation speed during relief, in accordance with the discharge pressure in the hydraulic pump. In other words, the work vehicle in Japanese Unexamined Patent Application Publication No. 2009-074405 reduces the engine rotation speed during relief to reduce the discharge flow rate from the hydraulic pump.

SUMMARY

As above described, from the view of preventing energy loss, the discharge flow rate from the hydraulic pump should be kept as small as possible during relief. Whereas, from the view of maintaining the performance of the work implement, the discharge pressure from the hydraulic pump should be kept at a prescribed pressure (e.g., around the relief pressure). Thus, it is important that the discharge pressure and the discharge flow rate from the hydraulic pump be stably controlled during relief.

Despite that, when the discharge flow rate of the hydraulic pump is reduced by reducing the engine rotation speed as with the above described work vehicle, there is a delay because the discharge flow rate of the hydraulic pump tends not to decrease promptly during relief. Thus, the discharge pressure of the hydraulic pump does not stabilize, tending to fluctuate. It also tends to be difficult to stably control the discharge flow rate of the hydraulic pump when the discharge pressure of the hydraulic pump is unstable.

Finally, reducing the engine rotation speed to reduce the discharge flow rate of the hydraulic pump does not lend itself to maintaining a high engine rotation speed while reducing the discharge flow rate of the hydraulic pump. That is, when the discharge flow rate of the hydraulic pump is reduced by reducing the engine rotation speed, the engine rotation speed keeps decreasing in the case where an actuator other than the work implement is driven, or the vehicle requires drive power to run.

The present invention proposes a work vehicle and a control method therefor capable of stably controlling the discharge pressure and the discharge flow rate of a hydraulic pump during relief regardless of the engine rotation speed.

Solution to Problem

A work vehicle according to exemplary embodiments of the present invention is provided with an engine, a hydraulic pump, a work implement, a pump displacement control device, a pump pressure detector, a relief valve, a travel device, a power transmission device, an accelerator operation member, a work implement operation member, and a controller. The hydraulic pump is driven by the engine. The hydraulic pump is a variable displacement hydraulic pump. The work implement is driven by hydraulic fluid discharged from the hydraulic pump. The pump displacement control device controls the displacement of the hydraulic pump. The pump pressure detector detects the discharge pressure from the hydraulic pump. The relief valve opens when the discharge pressure of the hydraulic pump reaches or exceeds a prescribed relief pressure. The travel device allows the vehicle to travel. The drive power from the engine enters the power transmission device. The power transmission device outputs the drive power for driving the travel device. The controller controls the power transmission device.

The controller includes a transmission requirement setting unit, a work implement requirement setting unit, an engine requirement setting unit, a required throttle setting unit, and a pump displacement setting unit. The transmission requirement setting unit sets a required traction force on the basis of an amount an accelerator operation member is operated. The required traction force is a target traction force for the travel device. The work implement requirement setting unit sets a required flow rate on the basis of an amount the work implement operation member is operated. The required flow rate is the target flow rate in the work implement. An engine requirement setting unit determines the horsepower required from the engine on the basis of the horsepower required by the transmission set on the basis of the required traction force, and the horsepower required by the work implement set on the basis of the required flow rate. A required throttle setting unit determines a commanded throttle value sent to the engine on the basis of the horsepower required from the engine. A pump displacement setting unit sets a target displacement for the hydraulic pump on the basis of the required flow rate. The work implement requirement setting unit sets an upper limit for the required flow rate to a prescribed flow rate limit value when the discharge pressure of the hydraulic pump is at or above a prescribed pressure threshold.

In one exemplary embodiment, during relief, the work implement requirement setting unit sets the upper limit of the required flow rate to a prescribed flow rate limit value to thereby reduce the discharge flow rate of the hydraulic pump. Hereby, the energy loss at the relief valve may be reduced. Additionally, the commanded throttle value sent to the engine is determined based on the required traction force. Therefore, when a large amount of drive power is required for the vehicle to run, the required traction force may be set to a large value to maintain a high engine rotation speed regardless of the relief operation. Whereas, when the vehicle is stopping, or when no drive power is needed for running the vehicle, the horsepower required from the engine may be reduced to thereby reduce the engine rotation speed. Thus, the discharge pressure and the discharge flow rate of the hydraulic pump can be stably controlled during relief regardless of the engine rotation speed.

The work implement requirement setting unit may preferably set an engine rotation speed required by the work implement on the basis of the required flow rate and the displacement of the hydraulic pump. The required throttle setting unit may set a first throttle value on the basis of the horsepower required from the engine, and may set a second throttle value on the basis of the engine rotation speed required by the work implement. Thereby, the required throttle setting unit may set the larger of the first throttle value and the second throttle value as the commanded throttle value sent to the engine.

In this case, the engine rotation speed may be increased when the operator manipulates the work implement operation member to a large extent. Thus, the operator may operate the work implement operation member without depending on operation of the accelerator operation member to adjust the speed of the work implement. Hereby the speed of the work implement and the vehicle speed may be adjusted through a simple operation. The energy losses can be suppressed because the upper limit of the required flow rate is limited to a prescribed flow rate limit value during relief even when the operator manipulates the work implement operation member to a large extent. Additionally, the commanded throttle value sent to the engine is determined on the basis of the limited required flow rate; therefore, increases in the engine rotation speed may be controlled. Thus, it is possible to improve the fuel efficiency of the work vehicle.

The work vehicle may preferably further include an engine rotation speed detector for detecting the engine rotation speed. The pump displacement setting unit may set a target displacement for the hydraulic pump on the basis of the required flow rate and the engine rotation speed. In this case, a desired discharge flow rate may be obtained regardless of the engine rotation speed by controlling the displacement of the hydraulic pump.

The work implement requirement setting unit may preferably increase the prescribed flow rate limit value while the vehicle is excavating. Here, the amount by which the discharge flow rate for the hydraulic pump is reduced during relief may be kept at a small value during excavation. Accordingly, the discharge flow rate may be promptly restored, even when the work implement state changes frequently during excavation. Hereby the responsiveness of the work implement may be improved.

The pump displacement control device may preferably change the displacement of the hydraulic pump in accordance with a command signal entered into the pump displacement control device. The pump displacement setting unit may establish a command signal sent to the pump displacement control device in accordance with the target displacement for the hydraulic pump. In this case, the target displacement of the hydraulic pump is set on the basis of the required flow rate, and the command signal sent to the pump displacement control device is established on the basis of the target flow rate for the hydraulic pump. Hereby, a desired discharge flow rate may be obtained by controlling the displacement to of the hydraulic pump.

The work vehicle may preferably further include a tilt-angle detector for detecting the tilt angle of the hydraulic pump. The pump displacement setting unit establishes the command signal sent to the pump displacement control device through feedback control on the basis of the actual displacement of the hydraulic pump corresponding to the tilt angle of the hydraulic pump, and the target displacement for the hydraulic pump. In this case, the discharge flow rate of the hydraulic pump may be more precisely controlled.

The power transmission device may preferably further include an input shaft, an output shaft, and a motor. The power transmission device may be configured so that varying the rotation speed of the motor varies the rotation speed ratio of the output shaft to the input shaft.

Another exemplary embodiment of the present invention is a control method for a work vehicle. The work vehicle is provided with an engine, a hydraulic pump, a work implement, a pump displacement control device, a pump pressure detector, a relief valve, a travel device, a power transmission device, an accelerator operation member, and a work implement operation member. The hydraulic pump is driven by the engine. The hydraulic pump is a variable displacement pump. The work implement driven by hydraulic fluid discharged from the hydraulic pump. The pump displacement control device controls the displacement of the hydraulic pump. The pump pressure detector detects the discharge pressure from the hydraulic pump. The relief valve opens when the discharge pressure of the hydraulic pump reaches or exceeds a prescribed relief pressure. The travel device allows the vehicle to travel. The drive power from the engine enters the power transmission device. The power transmission device outputs the drive power for driving the travel device.

A control method according to the exemplary embodiment includes first through fifth steps. The first step involves setting a required traction force on the basis of an amount an accelerator operation member is operated. The required traction force is a target traction force for the travel device. The second step involves setting a required flow rate on the basis of an amount the work implement operation member is operated. The required flow rate is the target flow rate in the work implement. The third step involves determining the horsepower required from the engine on the basis of the horsepower required by the transmission set on the basis of the required traction force, and the horsepower required by the work implement set on the basis of the required flow rate. The fourth step involves determining a commanded throttle value sent to the engine on the basis of the horsepower required from the engine. The fifth step involves setting a target displacement for the hydraulic pump on the basis of the required flow rate. During the second step an upper limit may be set for the required flow rate to a prescribed flow rate limit value when the discharge pressure of the hydraulic pump is at or above a prescribed pressure threshold.

In the control method according to the exemplary embodiment, during relief, the work implement requirement setting unit may set the upper limit of the required flow rate to a prescribed flow rate limit value to thereby reduce the discharge flow rate of the hydraulic pump. Hereby, the energy loss at the relief valve may be reduced. Additionally, the commanded throttle value sent to the engine is determined based on the required traction force. Therefore, when a large amount of drive power is required for the vehicle to run, the required traction force may be set to a large value to maintain a high engine rotation speed regardless of the relief operation. Whereas, when the vehicle is stopping, or when no drive power is needed for running the vehicle, the horsepower required from the engine may be reduced to thereby reduce the engine rotation speed. Thus, the discharge pressure and the discharge flow rate of the hydraulic pump can be stably controlled during relief regardless of the engine rotation speed.

According to exemplary embodiments of the present invention, a work vehicle and a control method therefor can stably control the discharge pressure and the discharge flow rate of a hydraulic pump during relief regardless of the engine rotation speed.

DETAILED DESCRIPTION OF EXEMPLARY EMBODIMENTS

Figure 1:
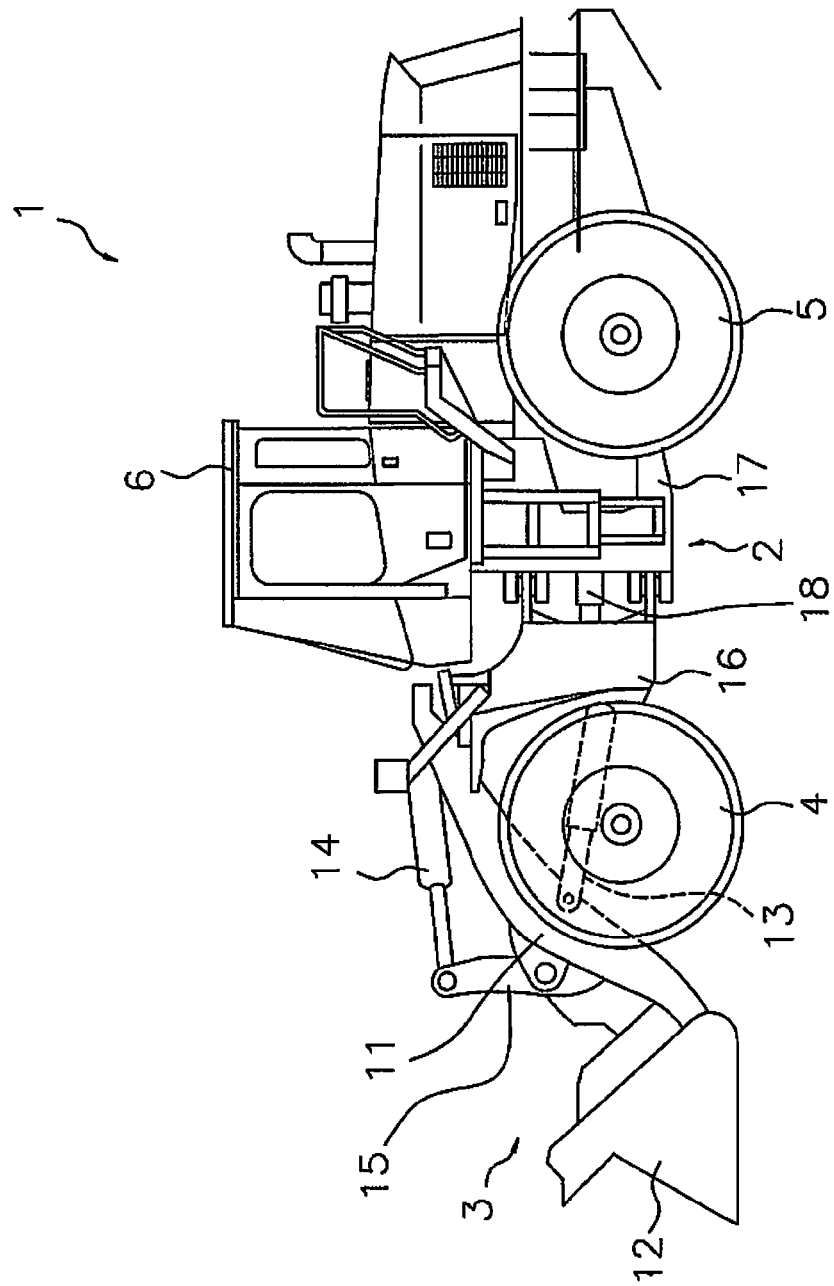
FIG. 1 is a side view illustrating a work vehicle according to an exemplary embodiment of the present invention.

Exemplary embodiments of the present invention are described below with reference to the drawings. FIG. 1 is a side view illustrating a work vehicle 1 according to an exemplary embodiment of the present invention. As illustrated in FIG. 1 the work vehicle 1 is provided with a vehicle frame 2, a work implement 3, running wheels 4, 5, and a cab 6. The work vehicle 1 is a wheel loader, and travels by rotationally driving the running wheels 4, 5. The work vehicle 1 uses the work implement 3 to perform work, such as excavation or digging.

The work implement 3 and the running wheels 4, 5 are attached to the vehicle frame 2. The work implement 3 is driven by hydraulic fluid from a later-described work implement pump 23 (refer to FIG. 2). A boom 11 and a bucket 12 are provided on the work implement 3. The boom 11 is mounted to the vehicle frame 2. The work implement 3 is provided with a lift cylinder 13, and a bucket cylinder 14. The lift cylinder 13 and the bucket cylinder 14 are hydraulic cylinders. One end of the lift cylinder 13 is attached to the vehicle frame 2. The other end of the lift cylinder 13 is attached to the boom 11. Hydraulic fluid from the work implement pump 23 extends and retracts the lift cylinder 13 to thereby rotate the boom 11 vertically. The bucket 12 is attached at the front end of the boom 11. One end of the bucket cylinder 14 is attached to the vehicle frame 2. The other end of the bucket cylinder 14 is attached to the bucket 12 via a bell crank 15. Hydraulic fluid from the work implement pump 23 extends and retracts the bucket cylinder 14 to thereby rotate the bucket 12 vertically.

The cab 6 is attached to the vehicle frame 2. The cab 6 is mounted on the vehicle frame 2. Arranged within the cab 6 are a seat whereon an operator may sit, an operation device (later described), and the like. The vehicle frame 2 includes a front frame 16 and a rear frame 17. The front frame 16 and the rear frame 17 are attached to be able to turn relative to each other horizontally.

The work vehicle 1 includes a steering cylinder 18. The steering cylinder 18 is attached to the front frame 16 and the rear frame 17. The steering cylinder 18 is also a hydraulic cylinder. Hydraulic fluid from a later-described steering pump 30 extends and retracts the steering cylinder 18 to thereby change the travel direction of the work vehicle 1 to the left or the right.

Figure 2:
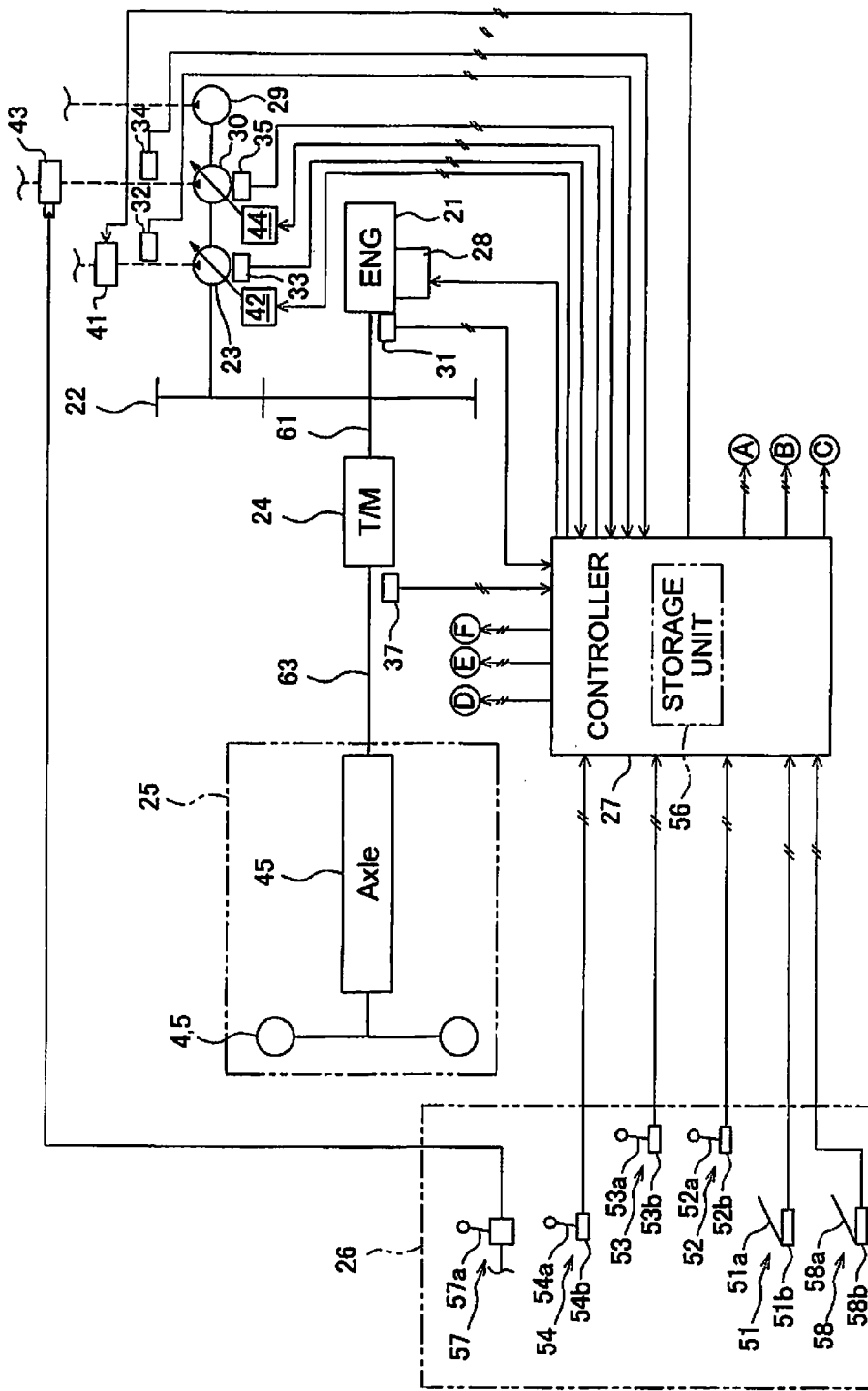
FIG. 2 is a schematic view illustrating a configuration of the work vehicle.

FIG. 2 is a schematic view illustrating a configuration of the work vehicle 1. As illustrated in FIG. 2, the work vehicle 1 is equipped with an engine 21, a power take off device 22 (termed "PTO 22" below), a power transmission device 24, a travel device 25, an operation device 26, a controller 27, and the like.

The engine 21 may be a diesel engine. Output of the engine 21 is controlled by adjusting the amount of fuel injected into a cylinder in the engine 21. The amount of fuel may be adjusted via the controller 27 controlling a fuel injector 28 installed in the engine 21. The work vehicle 1 is provided with an engine rotation speed detector 31. The engine rotation speed detector 31 detects the rotation speed of the engine and sends the controller 27 a detection signal indicative of the engine rotation speed.

The work vehicle 1 includes the work implement pump 23, the steering pump 30, and a transmission pump 29. The work implement pump 23, the steering pump 30, and the transmission pump 29 are hydraulic pumps. The PTO 22 (Power Take Oft) transmits a portion of the drive power from the engine 21 to the hydraulic pumps 23, 30, 29. In other words, the PTO 22 distributes the drive power from the engine 21 to the hydraulic pumps 23, 30, 29, and to the power transmission device 24.

The work implement pump 23 is driven by drive power from the engine 21. The hydraulic fluid discharged from the work implement pump 23 is supplied to the above-described lift cylinder 13 and the bucket cylinder 14 via a work implement control valve 41. The work vehicle 1 is equipped with a work implement pump pressure detector 32. The work implement pump pressure detector 32 detects the discharge pressure of the hydraulic fluid expelled from the work implement pump 23 (referred to as "work implement pump pressure" below), and sends the controller 27 a detection signal indicative of work implement pump pressure.

The work implement pump 23 is a variable displacement hydraulic pump. Changing the tilt angle of the swashplate or the tilt axis in the work implement pump 23 changes the displacement of the work implement pump 23. Note that the displacement of the work implement pump 23 signifies the amount of hydraulic fluid discharged from the work implement pump 23 per rotation in the pump. The displacement of the work implement pump 23 corresponds to the tilt angle. Furthermore, the discharge flow rate of the work implement pump 23 which is later described, signifies the amount of hydraulic fluid discharged from the work implement pump 23 per given unit of time.

The work implement pump 23 is connected to a first displacement control device 42. The first displacement control device 42 changes the tilt angle in the work implement pump 23 under the control of the controller 27. The controller 27 may thereby control the displacement of the work implement pump 23. The first displacement control device 42 changes the displacement of the work implement pump 23 in accordance with a command signal entered by the controller 27. The work vehicle 1 is equipped with a first tilt-angle detector 33. The first tilt-angle detector 33 detects the tilt angle in the work implement pump 23 and sends the controller 27 a detection signal representing the tilt angle.

Figure 3:
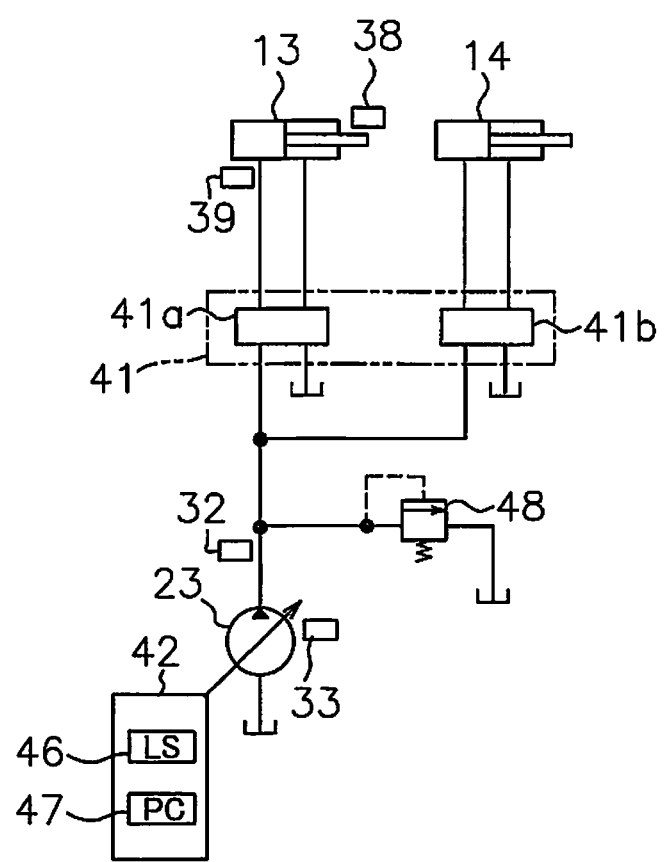
FIG. 3 is a schematic view illustrating a hydraulic circuit connected to a work implement pump.

More specifically, as illustrated in FIG. 3 the work implement control valve 41 contains a boom control valve 41a and a bucket control valve 41b. FIG. 3 is a schematic view illustrating a hydraulic circuit connected to a work implement pump 23. The boom control valve 41a controls the supply of hydraulic fluid to the lift cylinder 13. The bucket control valve 41b controls the supply of hydraulic fluid to the bucket cylinder 14.

In addition, a hydraulic circuit connected to the work implement pump 23 includes a relief valve 48. The relief valve 48 opens when the work implement pump pressure reaches or exceeds a prescribed relief pressure. Hereby, the work implement pump pressure may be adjusted to not exceed the relief pressure.

The first displacement control device 42 also includes a load sensing valve 46 (termed "LS valve 46" below), and a pump displacement control valve 47 (termed "PC valve 47" below). The LS valve 46 controls the displacement of the work implement pump 23 so that the pressure differential between the discharge pressure of the work implement pump 23 and the outlet hydraulic pressures of the boom control valve 41a and the bucket control valve 41b is prescribed value. More specifically, the maximum of the outlet hydraulic pressures at the boom control valve 41a and the bucket control valve 41b (termed "LS pressure" below) is input into the LS valve 46. LS valve 46 controls the displacement of the work implement pump 23 so that the pressure differential between the work implement pump pressure and the LS pressure is a prescribed value.

Note, the boom control valve 41a and the bucket control valve 41b are each equipped with pressure compensator valves (not shown) at their respective inlets. The pressure compensator valve generates a difference in pressure equivalent to the pressure differential between the LS pressure and the pressures at the respective outlets.

The PC valve 47 is an electromagnetic control valve that is controlled by command signals from the controller 27. The work implement pump pressure is input into the PC valve 47. As is later described, the PC valve 47 changes the relationship between the displacement of the work implement pump 23 and the work implement pump pressure in accordance with command signals from the controller 27. Consequently the controller 27 is able to control the PC valve 47 to thereby control the displacement of the work implement pump 23.

The work vehicle 1 includes a boom position detector 38. The boom position detector 38 detects the position of the boom 11. For instance, the boom position detector 38 may detect the position of the boom 11 by detecting the angle of the boom 11. The boom position detector 38 may be a sensor capable of directly detecting the angle of the boom 11. Alternatively, the boom position detector 38 may detect the angle of the boom 11 by detecting the stroke amount of the lift cylinder 13. The boom position detector 38 outputs a detection signal representing the position of the boom 11 to the controller 27.

The work vehicle 1 includes a boom pressure detector 39. The boom pressure detector 39 detects the bottom pressure of the lift cylinder 13. The bottom pressure of the lift cylinder 13 is the pressure of the hydraulic fluid in the oil chamber toward the bottom away from the lift cylinder 13. Hydraulic fluid is supplied to the oil chamber near the bottom of the lift cylinder 13 when the lift cylinder 13 extends. Hydraulic fluid is discharged from the oil chamber near the bottom of the lift cylinder 13 when the lift cylinder 13 retracts. Note that when the boom 11 is being held, a hydraulic pressure corresponding to the load required to hold the boom 11 acts on the oil chamber near the bottom of the lift cylinder 13. The boom pressure detector 39 inputs a detection signal representing the bottom pressure of the lift cylinder 13 into the controller 27.

The steering pump 30 in FIG. 2 is driven by the drive power from the engine 21. The hydraulic fluid discharged from the steering pump 30 is supplied to the steering cylinder 18 via a steering control valve 43. The work vehicle 1 is equipped with a steering pump pressure detector 34. The steering pump pressure detector 34 detects the pressure of the hydraulic fluid discharged from the steering pump 30 (termed "steering pump pressure" below), and sends the controller 27 a detection signal indicative of the steering pump pressure.

The steering pump 30 is a variable displacement hydraulic pump. Changing the tilt angle of the swashplate or the tilt axis in the steering pump 30 changes the displacement of the steering pump 30. The steering pump 30 is connected to a second displacement control device 44. The second displacement control device 44 changes the tilt angle in the steering pump 30 under the control of the controller 27. The controller 27 thereby controls the displacement of the steering pump 30. The work vehicle 1 is equipped with a second tilt-angle detector 35. The second tilt-angle detector 35 detects the tilt angle in the steering pump 30 and sends the controller 27 a detection signal representing the tilt angle.

The transmission pump 29 is driven by the drive power from the engine 21. The transmission pump 29 is a fixed displacement hydraulic pump. The hydraulic fluid discharged from the transmission pump 29 is supplied to clutches CF, CR, CL, CH in the power transmission device 24 via later-described clutch control valves VF, VR, VL, VH.

The PTO 22 transmits a portion of the drive power from the engine 21 to the power transmission device 24. In other words, a portion of the drive power from the engine 21 enters the power transmission device 24. The power transmission device 24 transmits the drive power from the engine 21 to the travel device 25. That is, the power transmission device 24 changes the speed of the drive power from the engine 21 and outputs the drive power for driving the travel device 25. The details on the configuration of the power transmission device 24 are described later.

The travel device 25 includes an axle 45 and running wheels 4, 5. The axle 45 transmits the drive power from the power transmission device 24 to the running wheels 4, 5. Hereby, the running wheels 4, 5 rotate. The work vehicle 1 is equipped with a vehicle-speed detector 37. The vehicle-speed detector 37 detects the rotation speed of the output shaft 63 (termed "output rotation speed" below) in the power transmission device 24. Given that the output rotation speed corresponds to the vehicle speed, the vehicle-speed detector 37 detects the vehicle speed by detecting the output rotation speed. The vehicle-speed detector 37 also detects the rotation direction of the output shaft 63. The rotation direction of the output shaft 63 corresponds to the travel direction of the work vehicle 1; therefore, the vehicle-speed detector 37 functions as a travel direction detector detecting the travel direction of the work vehicle 1 by detecting the rotation direction of the output shaft 63. The vehicle-speed detector 37 sends the controller 27 a detection signal indicative of the output rotation speed and the rotation direction.

The operator manipulates the operation device 26. The operation device 26 contains an acceleration operation device 51, a work implement operation device 52, a speed change operation device 53, a forward-reverse travel operation device 54 ("FR operation device 54" below), a steering operation device 57, and a braking operation device 58.

The acceleration operation device 51 includes an accelerator operation member 51a, and an acceleration operation detector 51b. The accelerator operation member 51a is operated to establish a required traction force (later described). Operating the accelerator operation member 51a changes the rotation speed of the engine 21. The acceleration operation detector 51b detects the degree to which the accelerator operation member 51a is operated (termed "accelerator operation amount" below). The acceleration operation detector 51b sends the controller 27 a detection signal indicative of the accelerator operation amount.

The work implement operation device 52 contains a work implement operation member 52a and a work implement operation detector 52b. The work implement operation member 52a is operated to move the work implement 3. The work implement operation detector 52b detects the position of the work implement operation member 52a. The work implement operation detector 52b outputs a detection signal to the controller 27 representing the position of the work implement operation member 52a. The work implement operation detector 52b detects the position of the work implement operation member 52a to thereby detect the degree to which the work implement operation member 52a is operated (termed "work implement operation amount" below).

The speed change operation device 53 includes a speed change operation member 53a, and a speed change operation detector 53b. The operator may manipulate the speed change operation member 53a to select a range of speeds for the power transmission device 24. The speed change operation detector 53b detects the position of the speed change operation member 53a. The positions of the speed change operation member 53a correspond to a plurality of speed ranges such as a first speed and a second speed. The speed change operation detector 53b outputs a detection signal to the controller 27 representing the position of the speed change operation member 53a.

The FR operation device 54 includes a forward-reverse travel operation member 54a ("FR operation member 54a" below), and a forward-reverse travel position detector 54b ("FR position detector 54b" below). The operator may manipulate the FR operation member 54a to thereby switch the work vehicle 1 between forward and reverse travel. The FR operation member 54a may be selectively switched to a forward-travel position (F), a neutral position (N), and a reverse-travel position (R). The FR position detector 54b detects the position of the FR operation member 54a. The FR position detector 54b outputs a detection signal to the controller 27 representing the position of the FR operation member 54a.

The steering operation device 57 includes a steering operation member 57a. A pilot hydraulic pressure is supplied to the steering control valve 43 based on the operation of the steering operation member 57a allowing the steering operation device 57 to thereby drive the steering control valve 43. Note that the steering operation device 57 may convert the operation of the steering operation member 57a into an electrical signal to drive the steering control valve 43. The operator may manipulate the steering operation member 57a to change the travel direction of the work vehicle 1 to the left or the right.

The braking operation device 58 includes a brake operation member 58a, and a braking operation detector 58b. The operator may manipulate the brake operation member 58a to control the braking force of the work vehicle 1. The braking operation detector 58b detects the degree to which the brake operation member 58a is operated (termed "brake operation amount" below). The braking operation detector 58b outputs a detection signal to the controller 27 indicative of the brake operation amount. Note that the brake oil pressure may be used as the brake operation amount.

The controller 27 includes a computing device, such as a CPU, and memory, such as RAM and ROM, and carries out processes for controlling the work vehicle 1. The controller 27 also includes a storage unit 56. The storage unit 56 stores programs and data for controlling the work vehicle 1.

The controller 27 sends a fuel injector 28 a command signal indicative of a commanded throttle value to obtain a prescribed target rotation speed in the engine 21. The details regarding the control of the engine 21 by the controller 27 are described later.

The controller 27 controls the work implement control valve 41 on the basis of a detection signal from the work implement operation detector 52b and thereby controls the hydraulic pressure supplied to the hydraulic cylinders 13, 14. The hydraulic cylinders 13, 14 thereby extend and retract, moving the work implement 3.

More specifically, the storage unit 56 stores work implement control valve command value information defining a relationship between the work implement operation amount and a command current value sent to the work implement control valve 41. For instance, the work implement control valve command value information is a map defining the relationship between the work implement operation amount and the command current value sent to the work implement control valve 41. The work implement control valve command value information may be in a format different from a map such as a table, or may be a numerical formula. The aperture size of the work implement control valve 41 is set in accordance with the command current value. The work implement control valve command value information may define the command current value so that the aperture size of the work implement control valve 41 increases as much as the work implement operation amount increases. The controller 27 references the work implement control valve command value information and determines the command current value sent to the work implement control valve 41 using the work implement operation amount.

The controller 27 also controls the power transmission device 24 on the basis of the detection signal from the detectors. The details regarding the control of the power transmission device 24 by the controller 27 are described later.

Figure 4:
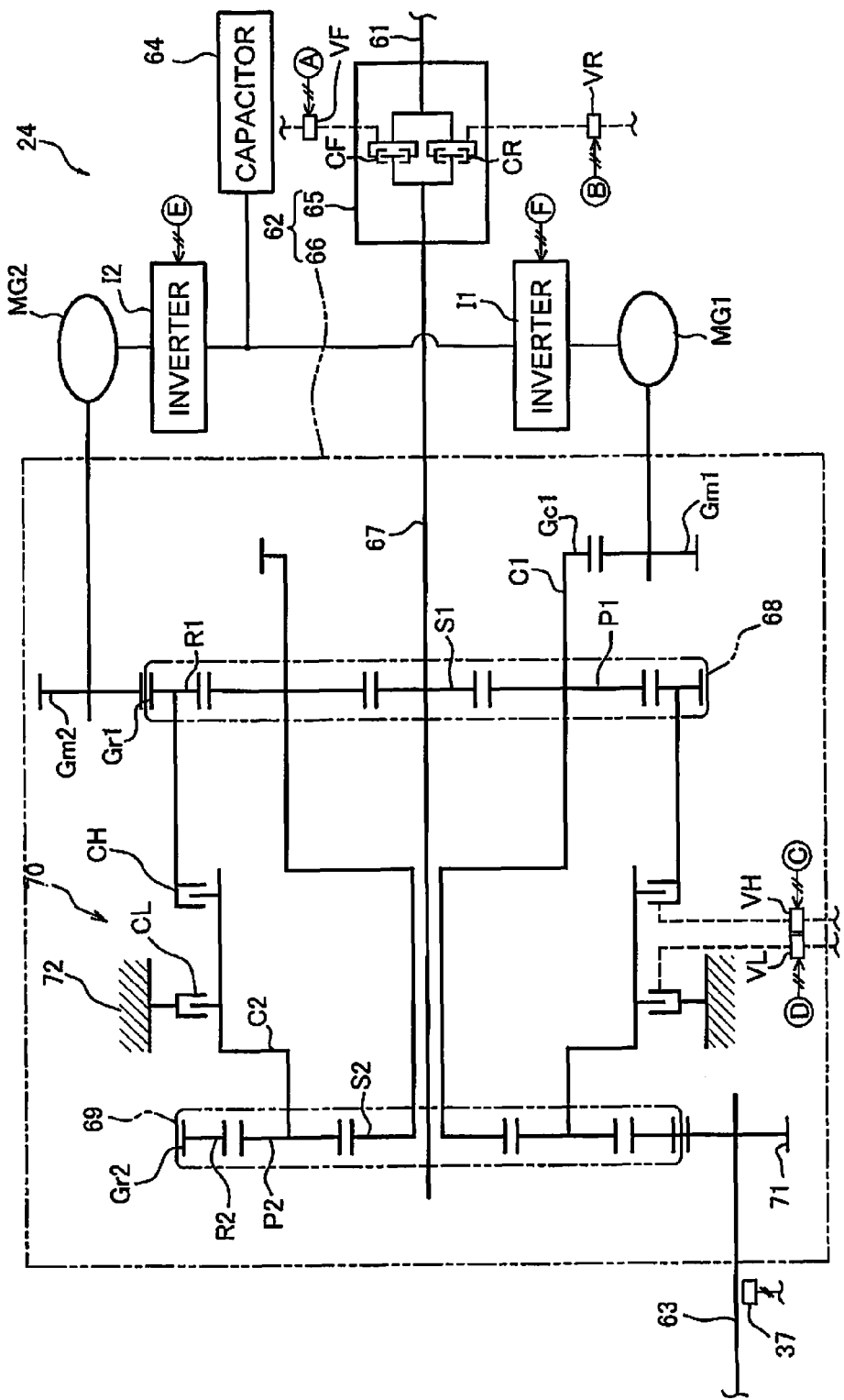
FIG. 4 is a schematic view illustrating a configuration of a power transmission device.

The details on the configuration of the power transmission device 24 are described next. FIG. 4 is a schematic view illustrating a configuration of a power transmission device 24. As illustrated in FIG. 4, the power transmission device 24 is provided with an input shaft 61, a gear mechanism 62, the output shaft 63, a first motor MG1, a second motor MG2, and a capacitor 64. The input shaft 61 is connected to the above described PTO 22. The rotations of the engine 21 are received by the input shaft 61 via the PTO 22. The gear mechanism 62 transmits the rotations of the input shaft 61 to the output shaft 63. The output shaft 63, connected to the above-described travel device 25, transmits the rotations from the gear mechanism 62 to the travel device 25.

The gear mechanism 62 transmits the drive power from the engine 21. The gear mechanism is configured to vary the rotation speed ratio of the output shaft 63 in relation to the input shaft 61 in accordance with the variations in the rotation speed of the motors MG1, MG2. The gear mechanism 62 includes an FR switching mechanism 65, and a speed change mechanism 66.

The FR switching mechanism 65 includes a forward travel clutch CF (termed "F-clutch CF", below), a reverse travel clutch CR (termed "R-clutch CR", below), and various gears (not shown). The F-clutch CF and the R-clutch CR are hydraulic; with the transmission pump 29 supplying the hydraulic fluid to each of clutches CF, CR. An F-clutch control valve VF controls the hydraulic fluid supplied to the F-clutch CF. An R-clutch control valve VR controls the hydraulic fluid supplied to the R-clutch CR. The clutch control valves VF, VR are controlled via the command signals from the controller 27.

Connecting and disconnecting the F-clutch CF and connecting and disconnecting the R-clutch CR changes the direction of rotation output from the FR switching mechanism 65. The F-clutch CF is connected and the R-clutch CR is disconnected when the vehicle is traveling forward. The F-clutch CF is disconnected and the R-clutch CR is connected when the vehicle is traveling in reverse.

The speed change mechanism 66 includes a power transmission shaft 67, a first planetary gear mechanism 68, a second planetary gear mechanism 69, a Hi-Lo switching mechanism 70, and an output gear 71. The power transmission shaft 67 is connected to the FR switching mechanism 65. The first planetary gear mechanism 68 and second planetary gear mechanism 69 are arranged on the same axis as the power transmission shaft 67.

The first planetary gear mechanism 68 includes a first sun gear S1, a plurality of first planetary gears P1, a first carrier C1 supporting the plurality of first planetary gears P1, and a first ring gear R1. The first sun gear S1 is connected to the power transmission shaft 67. The plurality of first planetary gears P1 engages with the first sun gear S1 and is supported on the first carrier C1 to be able to rotate. A first carrier gear Gc1 is provided on the outer periphery of the first carrier C1. The first ring gear R1 is able to rotate while engaged with the plurality of planetary gears P1. The first ring gear R1 also is provided with a first outer periphery ring gear Gr1 at the outer periphery thereof.

The second planetary gear mechanism 69 includes a second sun gear S2, a plurality of second planetary gears P2, a second carrier C2 supporting the plurality of second planetary gears P2, and a second ring gear R2. The second sun gear S2 is connected to the first carrier C1. The plurality of second planetary gears P2 engages with the second sun gear S2 and is supported on the second carrier C2 to be able to rotate. The second ring gear R2 is able to rotate while engaged with the plurality of planetary gears P2. The second ring gear R2 also is provided with a second outer periphery ring gear Gr2 at the outer periphery thereof. The second outer periphery ring gear Gr2 engages with the output gear 71 whereby the rotation of the second ring gear R2 is output to the output shaft 63 via the output gear 71.

The Hi-Lo switching mechanism 70 switches the drive power transmission route in the power transmission device 24 between a high-speed mode (Hi mode), where the vehicle speed is high, and the low-speed mode (Lo mode) where the vehicle speed is low. The Hi-Lo switching mechanism 70 includes an H-clutch CH which is connected during the Hi mode, and an L-clutch CL which is connected during the Lo mode. The H-clutch CH connects or disconnects the first ring gear R1 and the second carrier C2. Additionally, the L-clutch CL connects or disconnects the second carrier C2 and a fixed end 72, thereby prohibiting or permitting rotation of the second carrier C2.

The clutches CH, CL are hydraulic, with the transmission pump 29 supplying the hydraulic fluid thereto. The hydraulic fluid bound for the H-clutch CH is controlled by an H-clutch control valve VH. The hydraulic fluid bound for the L-clutch CL is controlled by an L-clutch CL control valve VL. The clutch control valves VH, VL are controlled via the command signals from the controller 27.

The first motor MG1 and the second motor MG2 are drive motors that generate drive power from electrical energy. The first motor MG1 and the second motor MG2 are also generators that use the drive power input there in to generate electrical energy. The controller 27 may provide a command signal to the first motor MG1 causing a torque reversed from the rotation direction of the first motor MG1 to act thereon. In this case, the first motor MG1 acts as a generator. A first motor gear Gm1 secured to the output shaft of the first motor MG1, engages with the first carrier gear Gc1. A first inverter I1 is also connected to the first motor MG1. The first inverter I1 is provided with a command signal from the controller 27 for controlling the motor torque in the first motor MG1.

The second motor MG2 is configured identically the first motor MG1. A second motor gear Gm2 secured to the output shaft of the second motor MG2, engages with the first outer periphery ring gear Gr1. A second inverter I2 is also connected to the second motor MG2. The second inverter I2 is provided with a command signal from the controller 27 for controlling the motor torque in the second motor MG2.

The capacitor 64 functions as an energy storage unit storing the energy generated by the motors MG1, MG2. That is, the capacitor 64 stores the electric power generated by the motors MG1, MG2 when a large amount of energy is generated in total between the motors MG1, MG2. The capacitor 64 also discharges electric power when a large amount of energy is consumed in total between the motors MG1, MG2. That is, the motors MG1, MG2 may be driven by the electric power stored in the capacitor 64. Alternatively, the electric power stored in the capacitor 64 may be used to drive the motors MG1, MG2. Note that the capacitor may be a battery.

The controller 27 receives the detection signals from the various detectors and provides each of the inverters I1, I2 with the command signals representing a commanded torque sent to the motors MG1, MG2. Note that the controller 27 may output rotation speed command to the motors MG1, MG2. In this case, the inverters I1, I2 calculate a commanded torque in accordance with the rotation speed command to control the motors MG1, MG2. The controller 27 may also provide the clutch control valves VF, VR, VH, VL with command signals for controlling clutch hydraulic pressure in the clutches CF, CR, CH, CL. Hereby the controller can control the speed change ratio in and the output torque of the power transmission device 24. The operation of the power transmission device 24 is described below.

Figure 5:
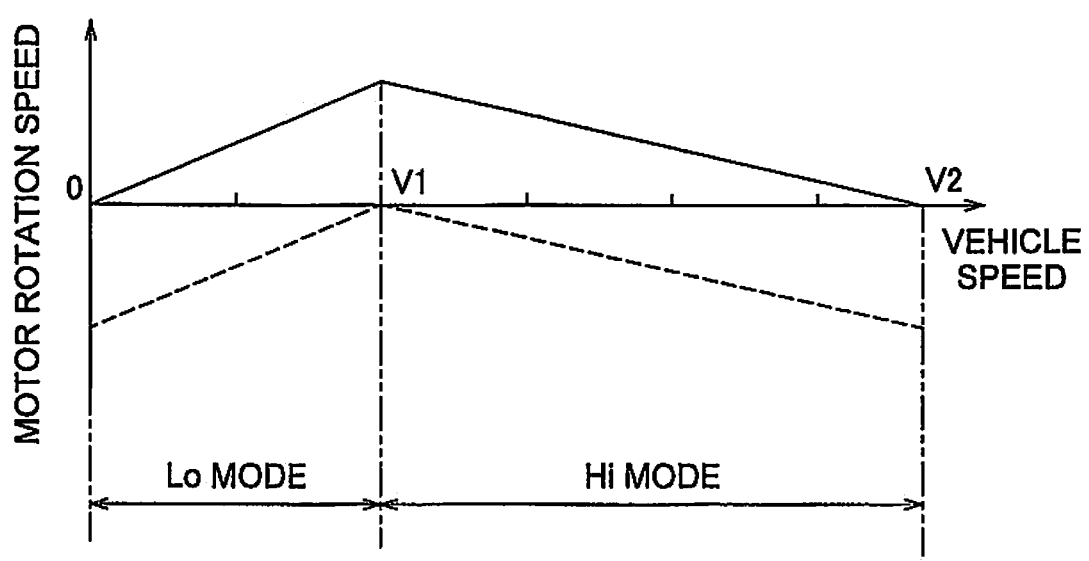
FIG. 5 illustrates the rotation speed variations of a first motor and a second motor in relation to the vehicle speed.

Here, the overall operations of the power transmission device 24 is described with reference to FIG. 5.; The vehicle speed increases from zero to forward travel while the rotation speed of the engine 21 is kept constant. FIG. 5 illustrates the rotation speed of the motors MG1, MG2 in relation to the vehicle speed. The vehicle speed varies depending on the rotation speed ratio of the power transmission device 24 when the rotation speed of the engine 21 is constant. The rotation speed ratio is the proportion of the rotation speed of the output shaft 63 in relation to the rotation speed of the input shaft 61. Accordingly, the variations in the vehicle speed in FIG. 5 match the variations in the rotation speed ratio in the power transmission device 24. That is, FIG. 5 illustrates the relationship between the rotation speed in the motors MG1, MG2 and the rotation speed ratio in the power transmission device 24. The solid line in FIG. 5 represents the rotation speed of the first motor MG1, and the dotted line represents the rotation speed of the second motor MG2.

The L-clutch CL is connected and the H-clutch CH is disconnected (i.e., Lo mode) in a range where the vehicle speed is from 0 to V1 inclusive. Given that the H-clutch CH is disconnected in Lo mode, the second carrier C2 and the first ring gear R1 are also disconnected. In addition, the L-clutch CL is connected, and therefore the second carrier C2 is fixed.

During Lo mode the drive power from the engine 21 is input into the first sun gear S1 via the power transmission shaft 67, and thereby the drive power is output from the first carrier C1 to the second sun gear S2. Whereas, the drive power input into the first sun gear S1 is transmitted from the first planetary gears P1 to the first ring gear R1, and thereby the drive power is output to the second motor MG2 via the first outer periphery ring gear Gr1 and the second motor gear Gm2. During the Lo mode the second motor MG2 acts primarily as a generator and a portion of the electric power generated by the second motor MG2 is stored in the capacitor 64. Another portion of the electric power generated by the second motor MG2 is also consumed to drive the first motor MG1.

Furthermore, during the Lo mode, the first motor MG1 acts primarily as an electric motor. The drive power from the first motor MG1 is output to the second sun gear S2 via the first motor gear Gm1, the first carrier gear Gc1, and the first carrier C1 respectively. The drive power output to the second sun gear S2 as above described is transmitted to the output shaft 63 via the second planetary gears P2, the second ring gear R2, the second outer periphery ring gear Gr2, and the output gear 71 respectively.

The H-clutch CH is connected and the L-clutch CL is disconnected (i.e., Hi mode) in the region where the vehicle speed exceeds V1. Given that the H-clutch CH is connected in Hi mode, the second carrier C2 and the first ring gear R1 are also connected. In addition, the L-clutch CL is disconnected, and therefore the second carrier C2 is also disconnected. Consequently, the rotation speed of the first ring gear R1 and the second carrier C2 match.

During Hi mode the drive power from the engine 21 is input into the first sun gear S1, and thereby the drive power is output from the first carrier C1 to the second sun gear S2. Additionally, the drive power input into the first sun gear S1 is output to the first motor MG1 from the first carrier C1 via the first carrier gear Gc1 and the first motor gear Gm1. During the Hi mode the first motor MG1 acts primarily as a generator; therefore, a portion of the electric power generated by the first motor MG1 is stored in the capacitor 64. Another portion of the electric power generated by the first motor MG1 is also consumed to drive the second motor MG2.

The drive power from the second motor MG2 is output to the second carrier C2 via the second motor gear Gm2, the first outer periphery ring gear Gr1, the first ring gear R1, and the H-clutch CH respectively. Output to the second sun gear S2 in the above-described manner, the drive power is also output to the second ring gear R2 via the second planetary gears P2, and the drive power output from a second carrier C2 is output to the second ring gear R2 via the second planetary gears P2. The drive power made to coincide via the second ring gear R2 is transmitted to the output shaft 63 via the second outer periphery ring gear Gr2 and the output gear 71.

Note that although the process for driving forward travel is described above, the operations are identical for driving reverse travel. Furthermore, the responsibilities of generator or motor of the first motor MG1, and the second motor MG2 are reversed during braking.

The control of the power transmission device 24 by the controller 27 is described next. The controller 27 controls the motor torque in the first motor MG1 and in the second motor MG2 to thus control the output torque of the power transmission device 24. In other words the controller 27 controls the motor torque in the first motor MG1 and in the second motor MG2 to thus control the traction force of the work vehicle 1. A method of setting the command value for the motor torque (hereafter, "commanded torque") sent to the first motor MG1 and the second motor MG2 is described below.

Figure 6:
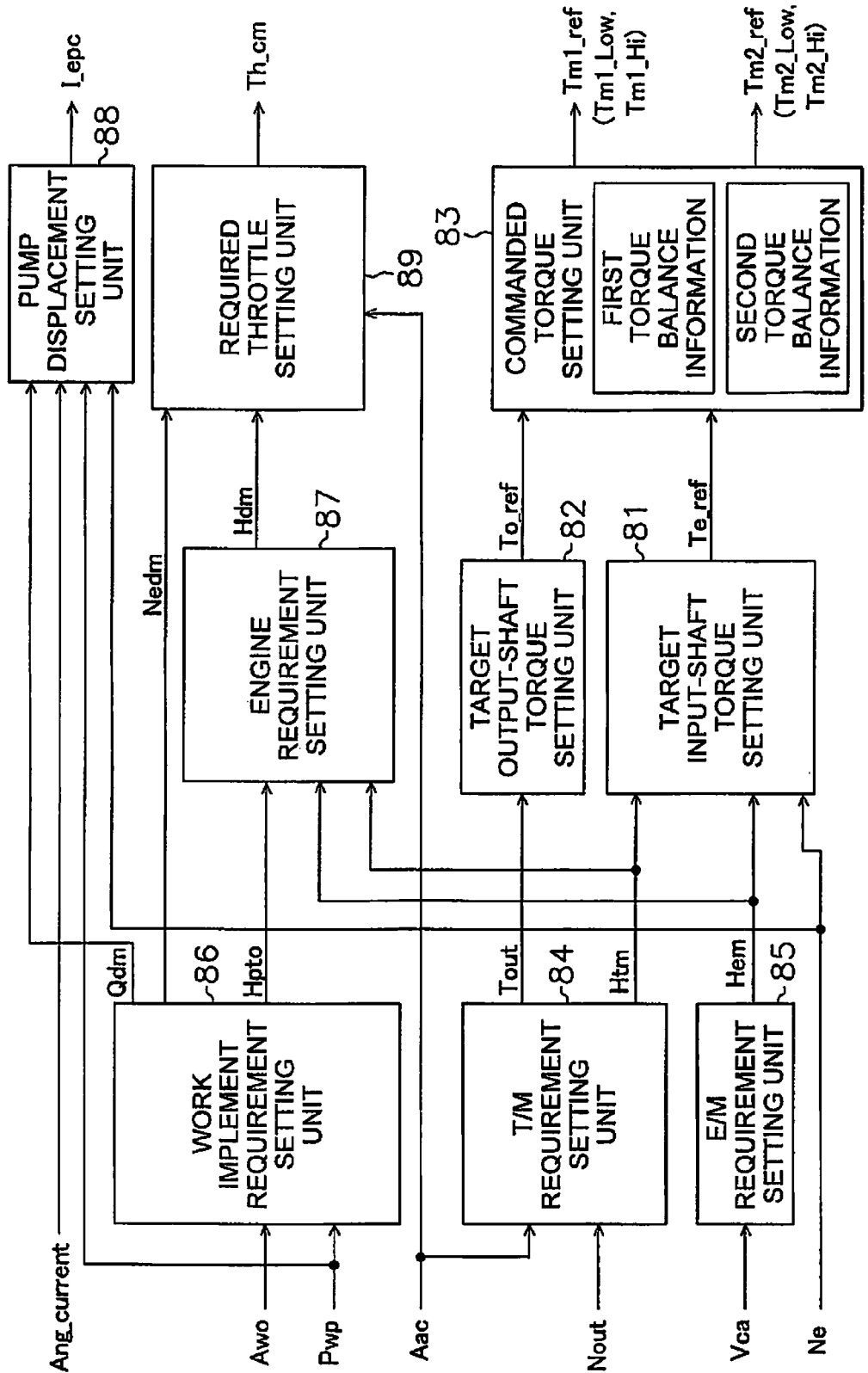
FIG. 6 is a block diagram representing a process for determining the commanded torque sent to a motor.

FIG. 6 is a controlled block diagram illustrating the process carried out by the controller 27. As illustrated in FIG. 6 the controller 27 includes a transmission requirement setting unit 84, and energy management requirement setting unit 85, and a work implement requirement setting unit 86.

The transmission requirement setting unit 84 determines a required traction force Tout on the basis of an accelerator operation amount Aac and an output rotation speed Nout. The required traction force is a target traction force for the travel device 25. More specifically the transmission requirement setting unit 84 determines the required traction force Tout from the output rotation speed Nout on the basis of a required traction force characteristic information D1 stored in the storage unit 56. The required traction force characteristic information D1 is data representing a required traction force characteristic which defines the relationship between the output rotation speed Nout and the required traction force Tout.

Figure 7:
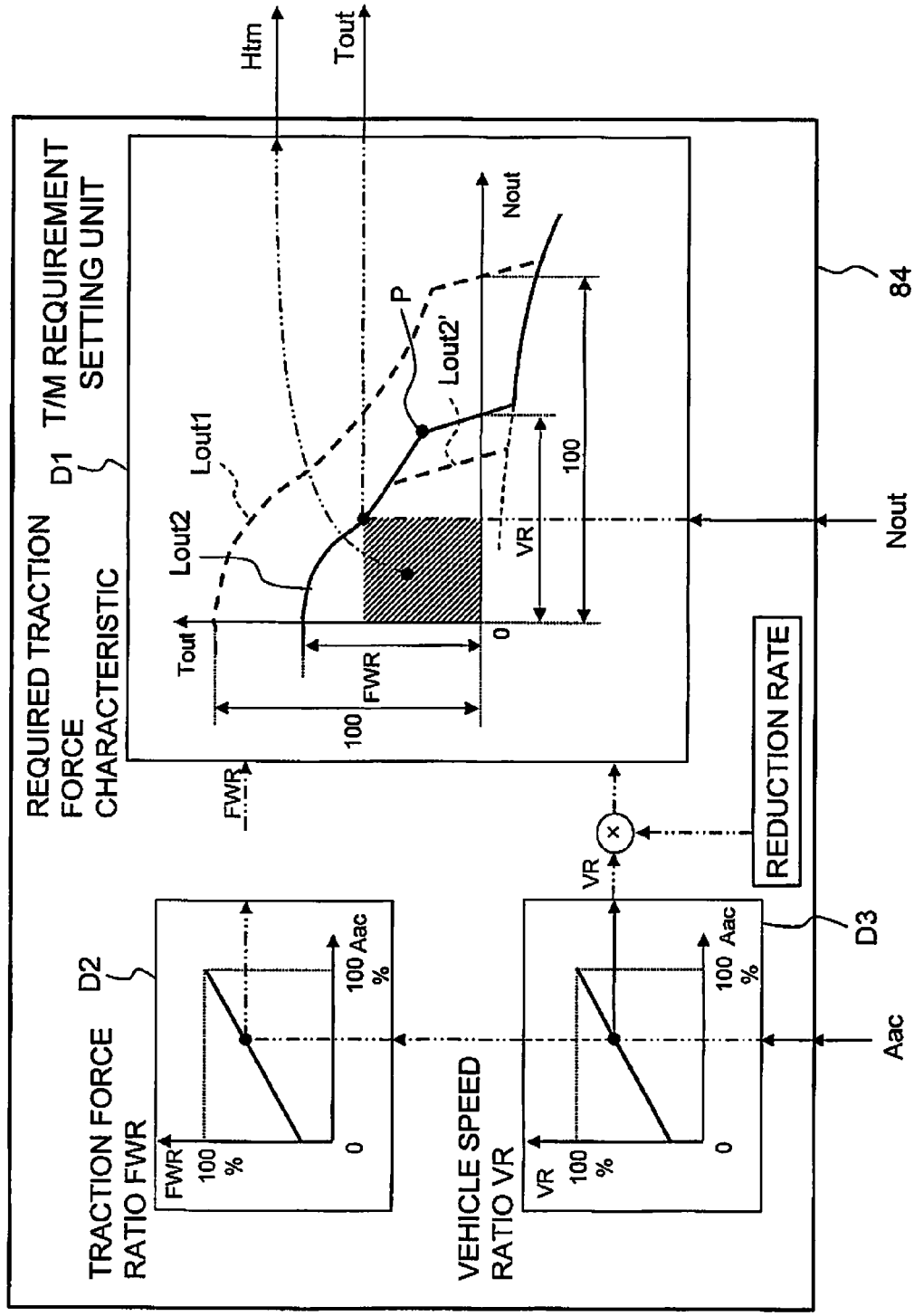
FIG. 7 is a block diagram illustrating the processing in a transmission requirement setting unit.

More specifically, as illustrated in FIG. 7 the storage unit 56 stores data Lout1 representing a required traction force characteristic used as a reference ("reference traction force characteristic Lout1" below). The reference traction force characteristic Lout1 is the required traction force characteristic when the accelerator operation amount Aac is the maximum value (i.e., 100%). The reference traction force characteristic Lout1 is prescribed in accordance with a speed range selected by the speed change operation member 53a. The transmission requirement setting unit 84 determines the current required traction force characteristic Lout2 by multiplying a traction force ratio FWR and a vehicle speed ratio VR with the reference traction force characteristic Lout1.

The storage unit 56 stores the traction force ratio information D2 and the vehicle speed ratio information D3. The traction force ratio information D2 defines the traction force ratio FWR in relation to the accelerator operation amount Aac. The vehicle speed ratio information D3 defines the vehicle speed ratio VR in relation to the accelerator operation amount Aac. The transmission requirement setting unit 84 sets the traction force ratio FWR and the vehicle speed ratio VR in accordance with the accelerator operation amount Aac. Multiplying the reference traction force characteristic Lout1 by the traction force ratio FWR which is along the vertical axis representing the required traction force, and the vehicle speed ratio VR which is along the horizontal axis representing the output rotation speed Nout, the transmission requirement setting unit 84 may thereby set a current required traction force characteristic information Lout2 responsive to the accelerator operation amount Aac.

The traction force ratio information D2 defines the traction force ratio FWR so that the traction force ratio FWR increases as the accelerator operation amount Aac increases. The vehicle speed ratio information D3 defines the vehicle speed ratio VR so that the vehicle speed ratio VR increases as the accelerator operation amount Aac increases. However, the traction force ratio FWR is greater than zero when the accelerator operation amount Aac is zero. Similarly, the vehicle speed ratio VR is greater than zero when the accelerator operation amount Aac is zero. Accordingly, the required traction force Tout is a value greater than zero even when the accelerator operation member 51a is not being operated. That is, the power transmission device 24 outputs a traction force even when the accelerator operation member 51a is not being operated. Hereby, the EMT type power transmission device 24 may be implemented with an identical behavior as the creep that occurs in a torque converter type speed change device.

Note that the required traction force characteristic information D1 defines the required traction force Tout so that the required traction force Tout increases in accordance with the decrease in the output rotation speed Nout. In addition, the transmission requirement setting unit 84 changes the required traction force characteristic to correspond to the speed range selected by the speed change operation member 53a on operation of the above-described speed change operation member 53a is operated. For example, when the speed change operation member 53a downshifts, the required traction force characteristic information changes from Lout2 to Lout2' as illustrated in FIG. 7. Hereby, the upper limit value of the output rotation speed Nout decreases. Namely, the upper limit value of the vehicle speed decreases.

The required traction force characteristic information D1 also defines the required traction force Tout so that the required traction force Tout is a negative value in relation to a prescribed output rotation speed Nout or greater. Therefore, when the output rotation speed Nout is greater than the upper limit value of an output rotation speed in the speed range selected, the required traction force Tout is determined as a negative value. Braking is initiated when the required traction force Tout is a negative value. Hereby, the EMT type power transmission device 24 may be implemented with a behavior identical to the engine brake that occurs in a torque converter type speed change device.

The energy management requirement setting unit 85 illustrated in FIG. 6 determines the horsepower Hem required for energy management on the basis of the amount of electric power remaining in the capacitor 64. The horsepower Hem required for energy management is the horsepower the power transmission device 24 needs to charge the capacitor 64. For instance, the energy management requirement setting unit 85 may determine the current capacitor charge amount from the voltage Vca of the capacitor 64. The smaller the current capacitor charge amount, the larger the energy management requirement setting unit 85 sets the horsepower Hem required for energy management.

The work implement requirement setting unit 86 determines the horsepower Hpto required by the work implement on the basis of the work implement pump pressure Pwp and an operation amount Awo of the work implement operation member 52a (termed "work implement operation amount Awo" below). In the embodiment the horsepower Hpto required by the work implement is distributed to the work implement pump 23. However, the horsepower Hpto required by the work implement may include horsepower distributed to the steering pump 30 and/or the transmission pump 29.

More specifically, the work implement requirement setting unit 86 determines a required flow rate Qdm in the work implement pump 23 from the work implement operation amount Awo on the basis of a required flow rate information D4. The required flow rate information D4 stored in the storage unit 56 defines the relationship between the required flow rate Qdm and the work implement operation amount Awo. The required flow rate information D4 defines the relationship between the required flow rate Qdm and the work implement operation amount Awo so that the required flow rate Qdm increases as much as the work implement operation amount Awo increases. The work implement requirement setting unit 86 determines the horsepower Hpto required by the work implement from the required flow rate Qdm and the work implement pump pressure Pwp.

The work implement requirement setting unit 86 also determines the engine rotation speed Nedm required by the work implement from the required flow rate Qdm and the displacement of the work implement pump 23. More specifically, the work implement requirement setting unit 86 determines the pump rotation speed required by the work implement by dividing the required flow rate Qdm by the displacement of the work implement pump 23. Taking into account factors in the rotational elements in the engine 21 and the work implement pump 23 such as the number of gears and the transmission efficiency therebetween, the work implement requirement setting unit 86 determines the engine rotation speed Nedm required by the work implement from the pump rotation speed required by the work implement.

The controller 27 includes a target output-shaft torque setting unit 82, a target input-shaft torque setting unit 81, and a commanded torque setting unit 83.

The target output-shaft torque setting unit 82 determines a target output-shaft torque To_ref. The target output-shaft torque To_ref is a target value for the torque output from the power transmission device 24. The target output-shaft torque setting unit 82 determines the target output-shaft torque To_ref on the basis of the required traction force Tout determined by the transmission requirement setting unit 84. That is, the target output torque To_ref is determined so that the traction force output from the power transmission device 24 conforms to the required traction force characteristic defined in the required traction force characteristic information D1. More specifically, the target output-shaft torque To_ref is determined by multiplying the required traction force Tout by a prescribed distribution rate. The prescribed distribution rate may be established, for instance, so that a total of the horsepower Hpto required by the work implement, the horsepower Htm required by the transmission, and the horsepower Hem required for energy management does not exceed the amount of horsepower output from the engine 21.

The target input-shaft torque setting unit 81 determines a target input-shaft torque Te_ref. The target input-shaft torque Te_ref is a target value for the torque entering the power transmission device 24. The target input-shaft torque setting unit 81 determines the target input-shaft torque Te_ref on the basis of the horsepower Htm required by the transmission and the horsepower Hem required for energy management. More specifically, the target input-shaft torque setting unit 81 computes the target input-shaft torque Te_ref by multiplying the horsepower Htm required by the transmission by the prescribed distribution rate, adding the result thereof to the horsepower Hem required for energy management, and multiplying the resulting summation by the engine rotation speed. Note that the horsepower Htm required by the transmission may be computed by multiplying the above-described required traction force Tout by the current output rotation speed Nout.

The commanded torque setting unit 83 determines commanded torques Tm1_ref, Tm2_ref for the motors MG1, MG2 in accordance with torque balance information from the target input-shaft torque Te_ref and the target output-shaft torque To_ref. The torque balance information defines a relationship between a target input-shaft torque Te_ref and a target output-shaft torque To_ref which balances the torque within the power transmission device 24. The torque balance information is stored in the storage unit 56.

As above described, the transmission routes of drive power in the power transmission device 24 defers in the Lo mode and the Hi mode. Therefore, the commanded torque setting unit 83 uses different torque balance information to determine the commanded torques Tm1_ref, Tm2_ref in the Lo mode and the Hi mode respectively. More specifically, the commanded torque setting unit 83 uses first torque balance information represented by the following Formula 1 to determine the commanded torques Tm1_Low, Tm2_Low for the motors MG1, MG2 during the Lo mode. In the embodiment, the first torque balance information is a formula that balances the torque in the power transmission device 24.

$Ts1\_Low = Te\_ref * r\_fr$ $Tc1\_Low = Ts1\_Low * (-1) * ((Zr1/Zs1)+1)$ $Tr2\_Low = To\_ref * (Zod/Zo)$ $Ts2\_Low = Tr2\_Low * (Zs2/Zr2)$ $Tcp1\_Low = Tc1\_Low + Ts2\_Low$ $Tm1\_Low = Tcp1\_Low * (-1) * (Zp1/Zp1d)$ $Tr1\_Low = Ts1\_Low * (Zr1/Zs1)$ $Tm2\_Low = Tr1\_Low * (-1) * (Zp2/Zp2d)$      Formula 1

The commanded torque setting unit 83 also uses second torque balance information represented by the following Formula 2 to determine the commanded torques Tm1_Hi, Tm2_Hi for the motors MG1, MG2 during the Hi mode. In the embodiment, the second torque balance information is a formula that balances the torque in the power transmission device 24.

$Ts1\_Hi = Te\_ref * r\_fr$ $Tc1\_Hi = Ts1\_Hi * (-1) * ((Zr1/Zs1)+1)$ $Tr2\_Hi = To\_ref * (Zod/Zo)$ $Ts2\_Hi = Tr2\_Hi * (Zs2/Zr2)$ $Tcp1\_Hi = Tc1\_Hi + Ts2\_Hi$ $Tm1\_Hi = Tcp1\_Hi * (-1) * (Zp1/Zp1d)$ $Tr1\_Hi = Ts1\_Hi * (Zr1/Zs1)$ $Tc2\_Hi = Tr2\_Hi * (-1) * ((Zs2/Zr2)+1)$ $Tcp2\_Hi = Tr1\_Hi + Tc2\_Hi$ $Tm2\_Hi = Tcp2\_Hi * (-1) * (Zp2/Zp2d)$      Formula 2

The particulars of the parameters used in the first and second torque balance information is represented in the following Table 1.

TABLE 1

| | |
|---|---|
| Te_ref | Target Input-Shaft Torque |
| To_ref | Target Output-Shaft Torque |
| r_fr | Speed Reduction Ratio in FR switching mechanism 65 (The FR switching mechanism 65 reduces the engine rotation speed by 1/r_fr and outputs the result. When the FR switching mechanism 65 is in forward travel, r_fr is a negative value. When the FR switching mechanism 65 is in reverse travel, r_fr is a positive value. |
| Zs1 | Number of gears in the sun gear S1 in the first planetary gear mechanism 68 |
| Zr1 | Number of gears in the ring gear R1 in the first planetary gear mechanism 68 |
| Zp1 | Number of gears in the first carrier gear Gc1 |
| Zp1d | Number of gears in the first motor gear Gm1 |
| Zs2 | Number of gears in the sun gear S2 in the second planetary gear mechanism 69 |
| Zr2 | Number of gears in the ring gear R2 in the second planetary gear mechanism 69 |
| Zp2 | Number of gears in the first outer periphery ring gear Gr1 |
| Zp2d | Number of gears in the second motor gear Gm2 |
| Zo | Number of gears in the second outer periphery ring gear Gr2 |
| Zod | Number of gears in the output gear 71 |

The details regarding the control of the engine 21 by the controller 27 are described next. As above described, the controller 27 controls the engine 21 by sending command signals to the fuel injector 28. A method of determining a commanded throttle value sent to the fuel injector 28 is described below. The controller 27 includes an engine requirement setting unit 87 and a required throttle setting unit 89.

The engine requirement setting unit 87 determines a horsepower Hdm required from the engine on the basis of the horsepower Hpto required by the work implement, the horsepower Htm required by the transmission, and the horsepower Hem required for energy management. More specifically, the engine requirement setting unit 87 sums the horsepower Hpto required by the work implement, the horsepower Htm required by the transmission, and the horsepower Hem required for energy management to determine the horsepower Hdm required from the engine.

Figure 8:
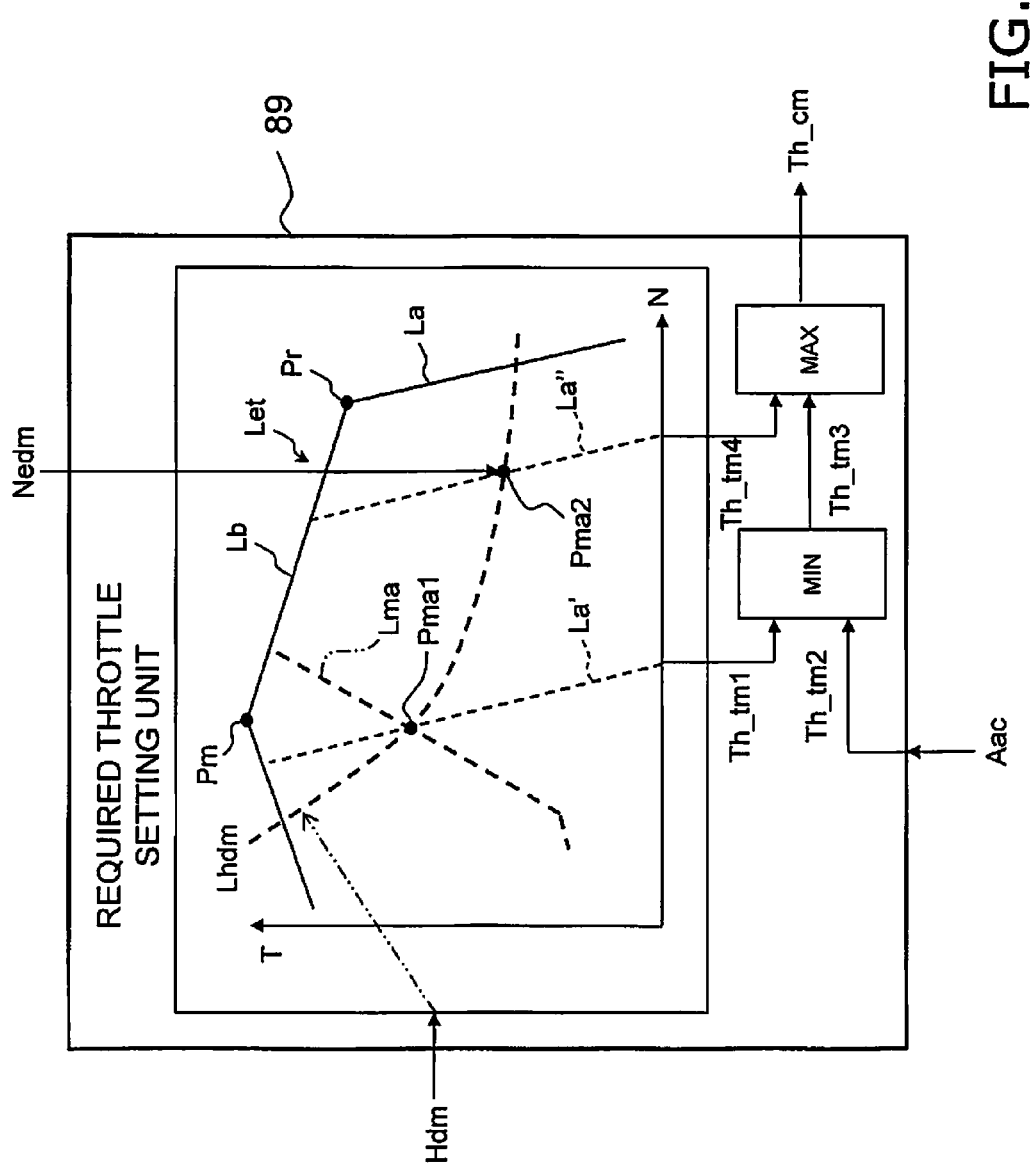
FIG. 8 is a block diagram illustrating the processing in a required throttle setting unit.

The required throttle setting unit 89 determines a commanded throttle value Th_cm from the horsepower Hdm required from the engine, the accelerator operation amount Aac, and the engine rotation speed Nedm required by the work implement. More specifically, as illustrated in FIG. 8, the storage unit 56 stores an engine torque line Let, and a matching line Lma. The engine torque line Let defines the relationship between the output torque of the engine 21 and the engine rotation speed Ne. The engine torque line Let includes a regulation region La and a total load region Lb.

The regulation region La changes in accordance with the commanded throttle value Th_cm (see La' in FIG. 8). The total load region Lb includes a regulation point Pr, and a maximum torque point Pm which is located towards the lower engine rotation speed side than the regulation point Pr.

The matching line Lma is used to determine a first required throttle value Th_tm1 from the horsepower Hdm required from the engine. Although the matching line Lma may be established as desired, in the embodiment, the matching line Lma is created in the total load region Lb along the engine torque line Let passing through a location closer to the maximum torque point Pm than the regulation point Pr.

The required throttle setting unit 89 determines a first required throttle value Th_tm1 so that the engine torque line Let and the matching line Lma match at a matching point Pma1 which is where the output torque of the engine 21 is corresponds to the horsepower Hdm required from the engine 21. That is, an intersection of an equivalent horsepower line Lhdm corresponding to the horsepower Hdm required from the engine and a matching line Lma is established as the first matching point Pma1. The required throttle setting unit 89 determines the first required throttle value Th_tm1 so that the regulation region (see La') on the engine torque line Let passes through the first matching point Pma1.

The required throttle setting unit 89 then selects the smaller of the first required throttle value Th_tm1 and a second required throttle value Th_tm2 that corresponds to the accelerator operation amount Aac as a third required throttle value Th_tm3. Additionally, when the speed control of the work implement 3 is performed by way of the engine rotation speed (later described), the required throttle setting unit 89 determines a fourth required throttle value Th_tm4 on the basis of the engine rotation speed Nedm required by the work implement. More specifically, the required throttle setting unit 89 selects the fourth required throttle value Th_tm4 so that the regulation region (La'') along the engine torque line Let passes through a point Pma2 which is where the engine rotation speed becomes the engine rotation speed Nedm required by the work implement along the equivalent horsepower line Lhdm. The required throttle setting unit 89 then selects the larger of the third required throttle value Th_tm3 and the fourth required throttle value Th_tm4 as the commanded throttle value Th_cm. Note that when the speed control of the work implement 3 is not performed by way of the engine rotation speed, the required throttle setting unit 89 selects the third required throttle value Th_tm3 as the commanded throttle value Th_cm.

Figure 9:
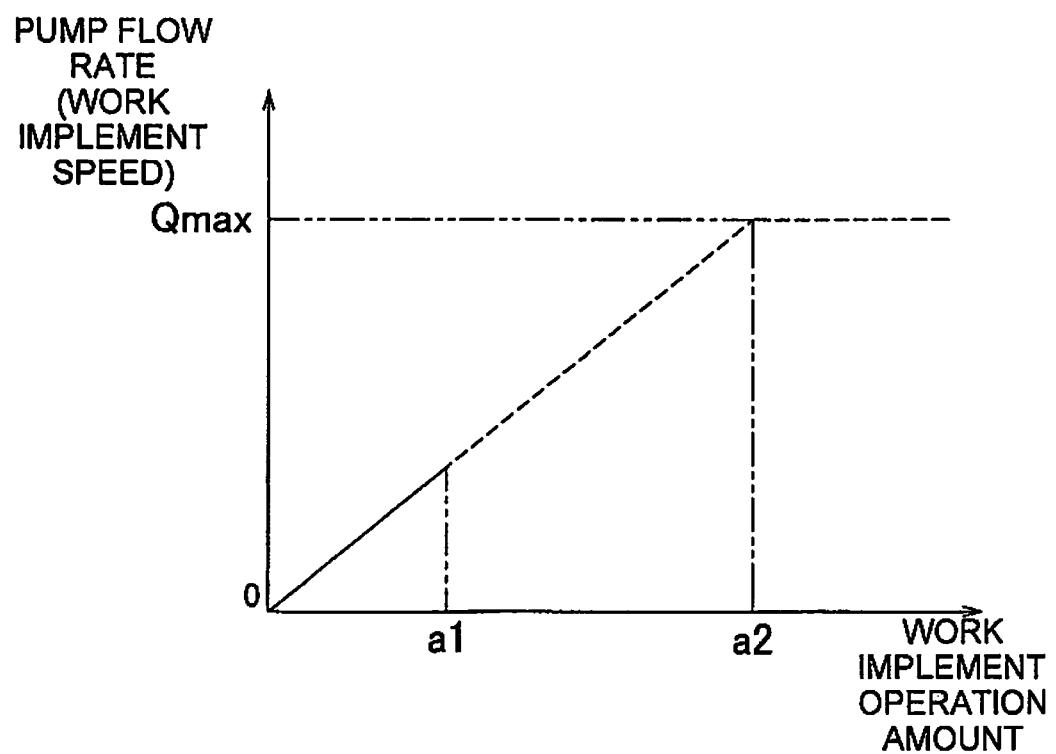
FIG. 9 is a graph illustrating the relationship between a work implement operation amount and a discharge flow rate in a work implement pump.

Controlling the speed of the work implement 3 is described next. FIG. 9 is a graph illustrating the relationship between a work implement operation amount Awo and a discharge flow rate in a work implement pump 23. The speed of the work implement 3 increases as much as the discharge flow rate in the work implement pump 23 increases. Accordingly, the variations in the discharge flow rate of the work implement pump 23 in FIG. 9 represent the variations in the speed of the work implement 3. The relationship between the work implement operation amount Awo and the discharge flow rate of the work implement pump need not be linear as illustrated in FIG. 9 and may be variable.

As illustrated in FIG. 9, the controller 27 increases the discharge flow rate of the work implement pump 23 in accordance with the increase in the work implement operation amount Awo. The controller 27 determines a command current value sent to the work implement control valve 41 in accordance with the work implement operation amount Awo to thereby control the aperture size of the work implement control valve 41. As above described, the first displacement control device 42 uses a load sensing valve to control the displacement of the work implement pump 23 so that a pressure differential between the discharge pressure of the work implement pump 23 and the outlet hydraulic pressure of the work implement control valve 41 is a prescribed value. In FIG. 9 when the work implement operation amount Awo is equal to or greater than zero and less than a1, increasing the displacement of the work implement pump 23 in accordance with the increase in the work implement operation amount Awo thereby increases the discharge flow rate of the work implement pump 23. In other words, controlling the displacement of the work implement pump 23 can control the speed of the work implement 3.

When the work implement operation amount Awo reaches a1, the work implement pump 23 is at maximum displacement. When the work implement operation amount Awo is equal to or greater than a1, the controller 27 determines the commanded throttle value Th_cm on the basis of the engine rotation speed Nedm required by the work implement. That is, when the work implement operation amount Awo is equal to or greater than a1, the required throttle setting unit 89 increases the engine rotation speed in accordance with the increase of the amount the work implement operation member 52a is operated. The speed of the work implement 3 thereby increases. Note that when the work implement operation amount Awo is greater than or equal to a2, the discharge flow rate is constant at upper limit value Qmax.

When the speed control of the work implement 3 is performed by way of the engine rotation speed as detailed above, the transmission requirement setting unit 84 reduces the required traction force from the determined value on the basis of the operation amount the accelerator operation member 51a is operated. More specifically, as illustrated in FIG. 7, the transmission requirement setting unit 84 reduces the required traction force by multiplying the vehicle speed ratio VR by a prescribed reduction rate. The prescribed decreasing rate is a value less than one. The prescribed reduction rate is set to increase in accordance with an increase in the work implement operation amount Awo. Otherwise, the prescribed reduction rate may be a constant value.

Figure 10:
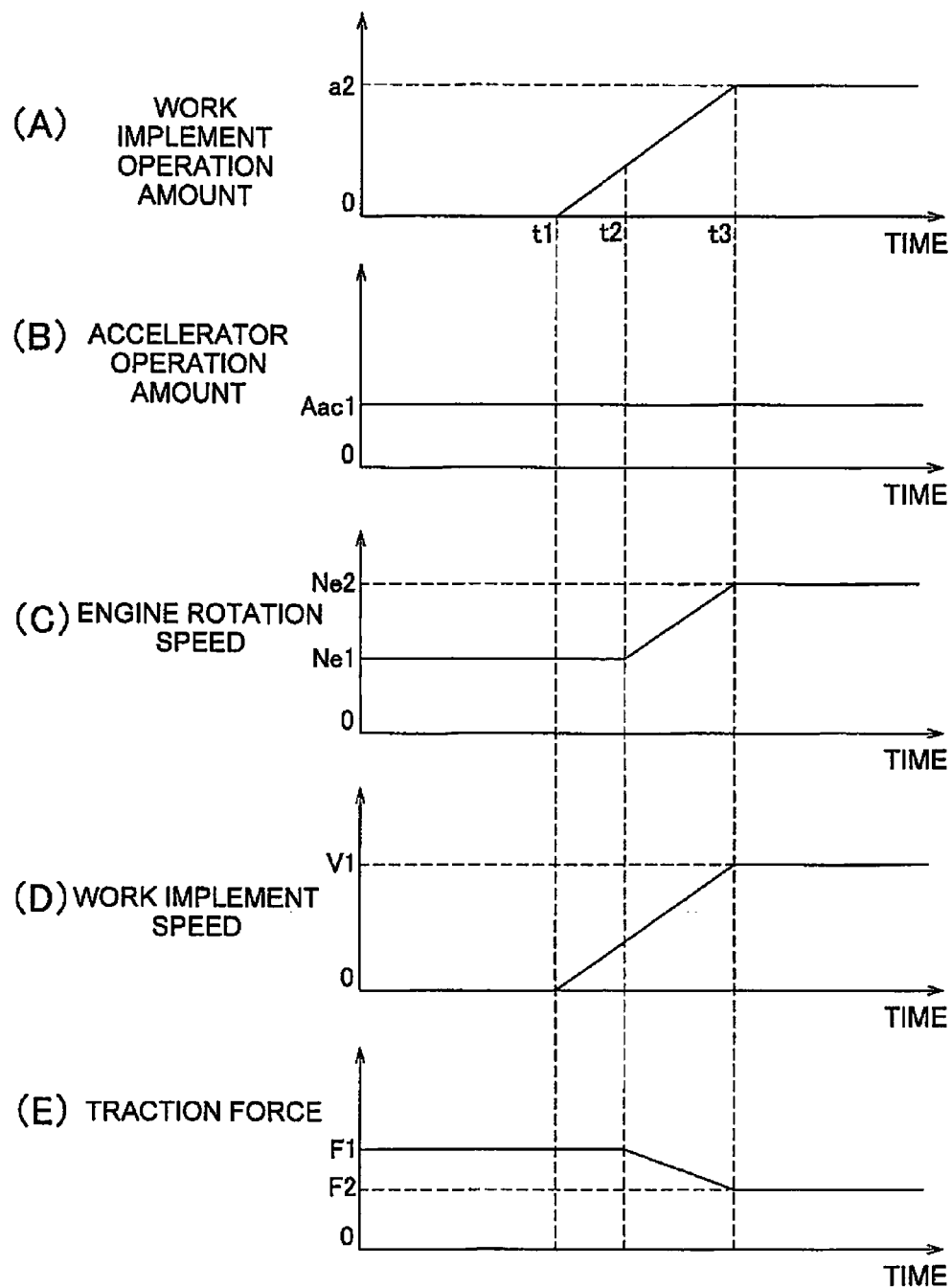
FIGS. 10A-10E include timing charts illustrating examples of variations in parameters used to control the speed of the work implement.

FIGS. 10A-10E include timing charts illustrating examples of variations in parameters used to control the speed of the work implement 3. As illustrated in FIG. 10B, an accelerator operation amount Aac1 is kept constant. As illustrated in FIG. 10A, the speed of the work implement 3 is at zero (FIG. 10D) when the work implement operation amount Awo is zero (time 0 to t1). The engine rotation speed is also constant at Ne1 (FIG. 10C), and the traction force is constant at F1 (FIG. 10E).

When the work implement operation amount Awo increases from zero, controlling the discharge displacement controls the speed of the work implement 3 until the discharge displacement of the work implement 3 becomes the maximum displacement. Therefore, although the engine rotation speed is constant at Ne1, the speed of the work implement 3 increases (time t1 to t2). At this point, the traction force is also constant at F1.

Once the work implement operation amount Awo increases further and the discharge displacement of the work implement 3 is at the maximum displacement, controlling the engine rotation speed may control the speed of the work implement 3 (time t2 to t3). At this point, the engine rotation speed increases as much as the work implement operation amount Awo increases, increasing the speed of the work implement 3. The traction force also decreases as much as the work implement operation amount Awo increases.

The engine rotation speed becomes constant at Ne2 once the work implement operation amount Awo reaches equal to or greater than a2. The speed of the work implement 3 then becomes constant at V1. At this point, the traction force is also constant at F2.

The limiting of the relief flow rate is described next. To limit the relief flow rate, the controller 27 sets an upper limit for the discharge flow rate from the work implement pump 23 to a prescribed flow rate limit value when the work implement pump pressure Pwp reaches or exceeds a prescribed pressure threshold. More specifically, the above-described work implement requirement setting unit 86 sets the upper limit of the required flow rate to a prescribed flow rate limit value when the discharge pressure of the hydraulic pump reaches or exceeds a prescribed pressure threshold.

Figure 11:
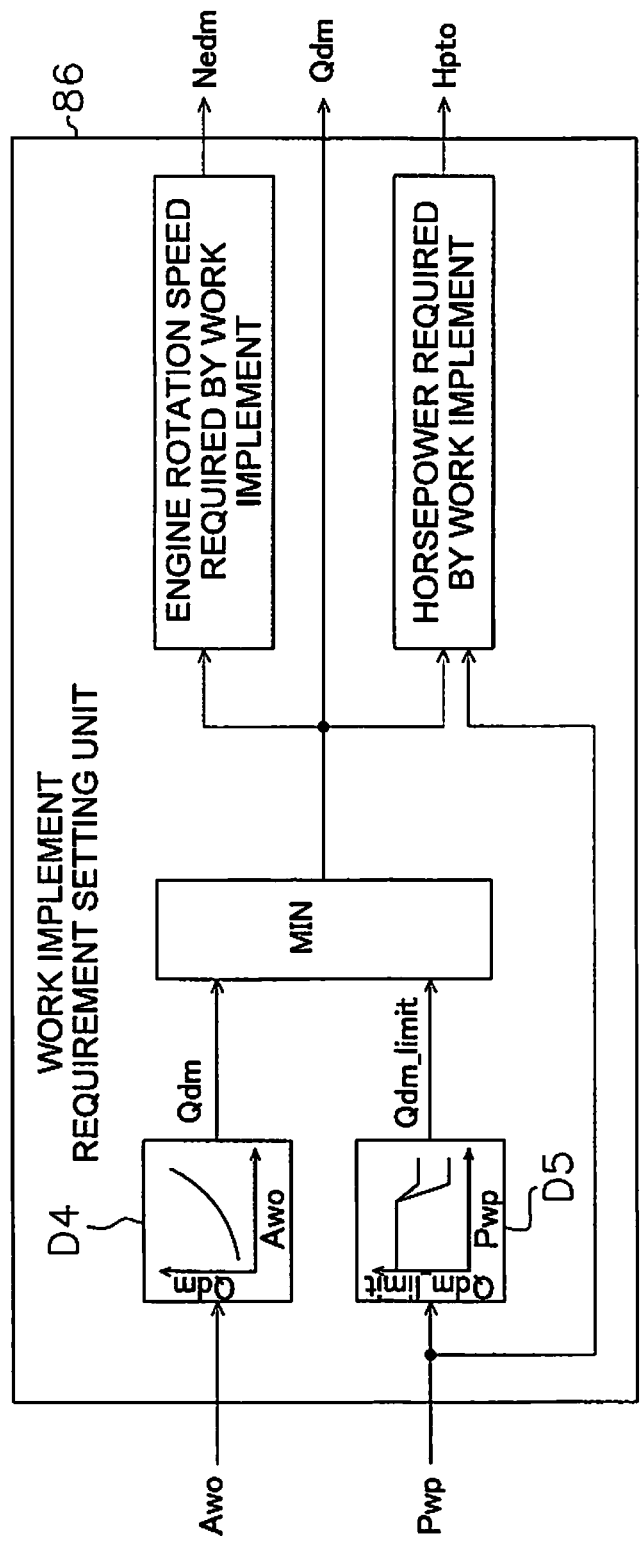
FIG. 11 is a control block diagram illustrating the processing that takes place when limiting the relief flow rate.

FIG. 11 is a control block diagram illustrating the processing that takes place when limiting the relief flow rate. As described above the work implement requirement setting unit 86 determines a required flow rate Qdm in the work implement pump 23 from the work implement operation amount Awo on the basis of a required flow rate information D4. The work implement requirement setting unit 86 also uses the work implement pump pressure Pwp to set a flow rate limit value Qdm_limit for the work implement pump 23 on the basis of flow rate limit information D5 as illustrated in FIG. 11. The flow rate limit information D5 is stored in the storage unit 56 and defines a relationship between the work implement pump pressure Pwp and the flow rate limit value Qdm_limit in the work implement pump 23.

Figure 12:
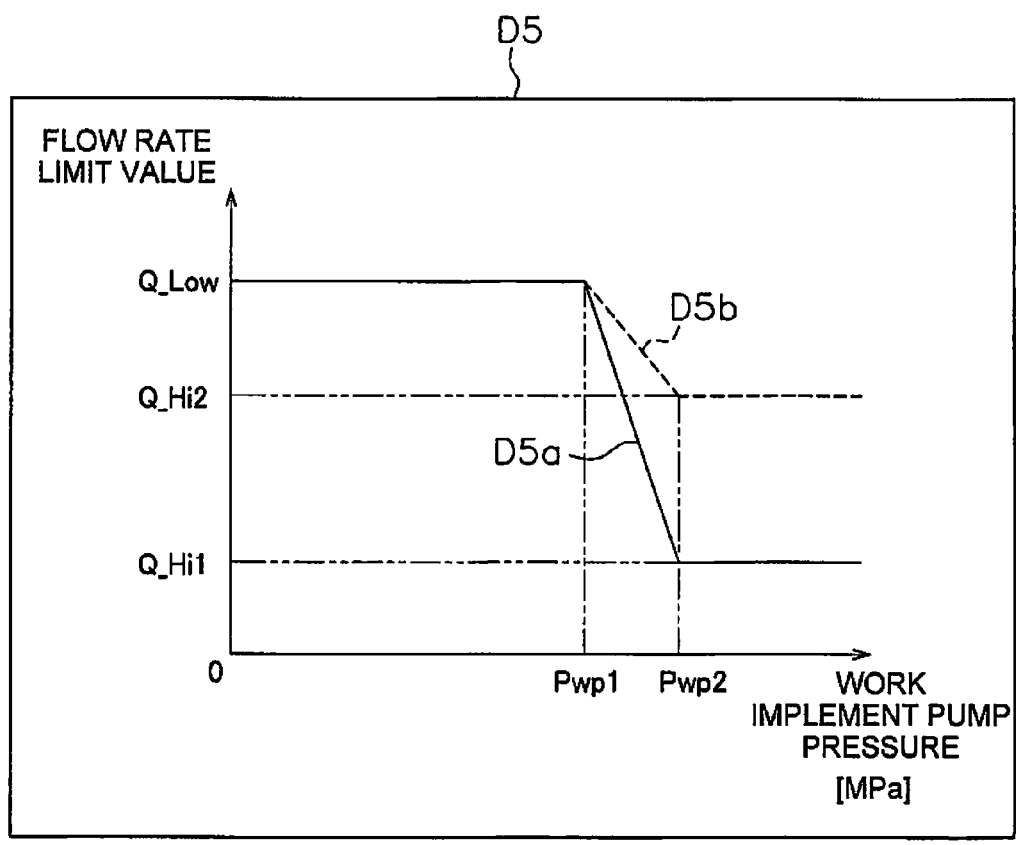
FIG. 12 is a graph illustrating an example of flow rate limit information.

FIG. 12 is a graph illustrating an example of flow rate limit information D5. As illustrated in FIG. 12, the flow rate limit information D5 includes normal-operation limit information D5a, and excavation-operation limit information D5b. The normal-operation limit information D5a is used when no excavation operation is taking place. The excavation-operation limit information D5b is used while an excavation operation is taking place. The flow rate limit value Qdm_limit in the normal-operation limit information D5a is constant at a prescribed first limit value Q_Low when the work implement pump pressure Pwp is no greater than a prescribed limiting start pressure Pwp1. Furthermore, the flow rate limit value Qdm_limit decreases as much as the work implement pump pressure Pwp increases when the work implement pump pressure Pwp is greater than the prescribed limiting start pressure Pwp1 and is smaller than a prescribed minimum limiting pressure Pwp2. Finally, the flow rate limit value Qdm_limit is constant at a second limit value Q_Hi1 smaller than the first limit value Q_Low, when the work implement pump pressure Pwp is no less than the prescribed minimum limiting pressure Pwp2.

The flow rate limit value Qdm_limit in the excavation-operation limit information D5b changes in accordance with the work implement pump pressure Pwp in the same manner as in the normal-operation limit information D5a. However, the prescribed second limit value Q_Hi2 in the excavation-operation limit information D5b is greater than the prescribed second limit value Q_Hi1 in the normal-operation limit information D5a. Accordingly, the work implement requirement setting unit 86 increases the prescribed flow rate limit value Qdm_limit while the vehicle is excavating.

Note that the limiting start pressure Pwp1 and the minimum limiting pressure Pwp2 may be values near the above-described relief pressure. The minimum limiting pressure Pwp2 is greater than the limiting start pressure Pwp1. The limiting start pressure Pwp1 and the minimum limiting pressure Pwp2 are preferably smaller than the relief pressure of the relief valve 48.

As illustrated in FIG. 11, the work implement requirement setting unit 86 compares the flow rate limit value Qdm_limit and the required flow rate Qdm determined from the work implement operation amount Awo and selects the smaller value as the required flow rate Qdm. Consequently, the work implement requirement setting unit 86 will select the flow rate limit value Qdm_limit as the required flow rate Qdm when the required flow rate Qdm determined from the work implement operation amount Awo exceeds the flow rate limit value Qdm_limit. Namely, the flow rate limit value Qdm_limit is the upper limit of the required flow rate Qdm. The work implement requirement setting unit 86 determines the above-described engine rotation speed Nedm required by the work implement from the required flow rate Qdm set in the above manner, and the discharge displacement of the work implement pump 23. The work implement requirement setting unit 86 also determines the horsepower Hpto required by the work implement from the required flow rate Qdm and the work implement pump pressure Pwp.

Figure 13:
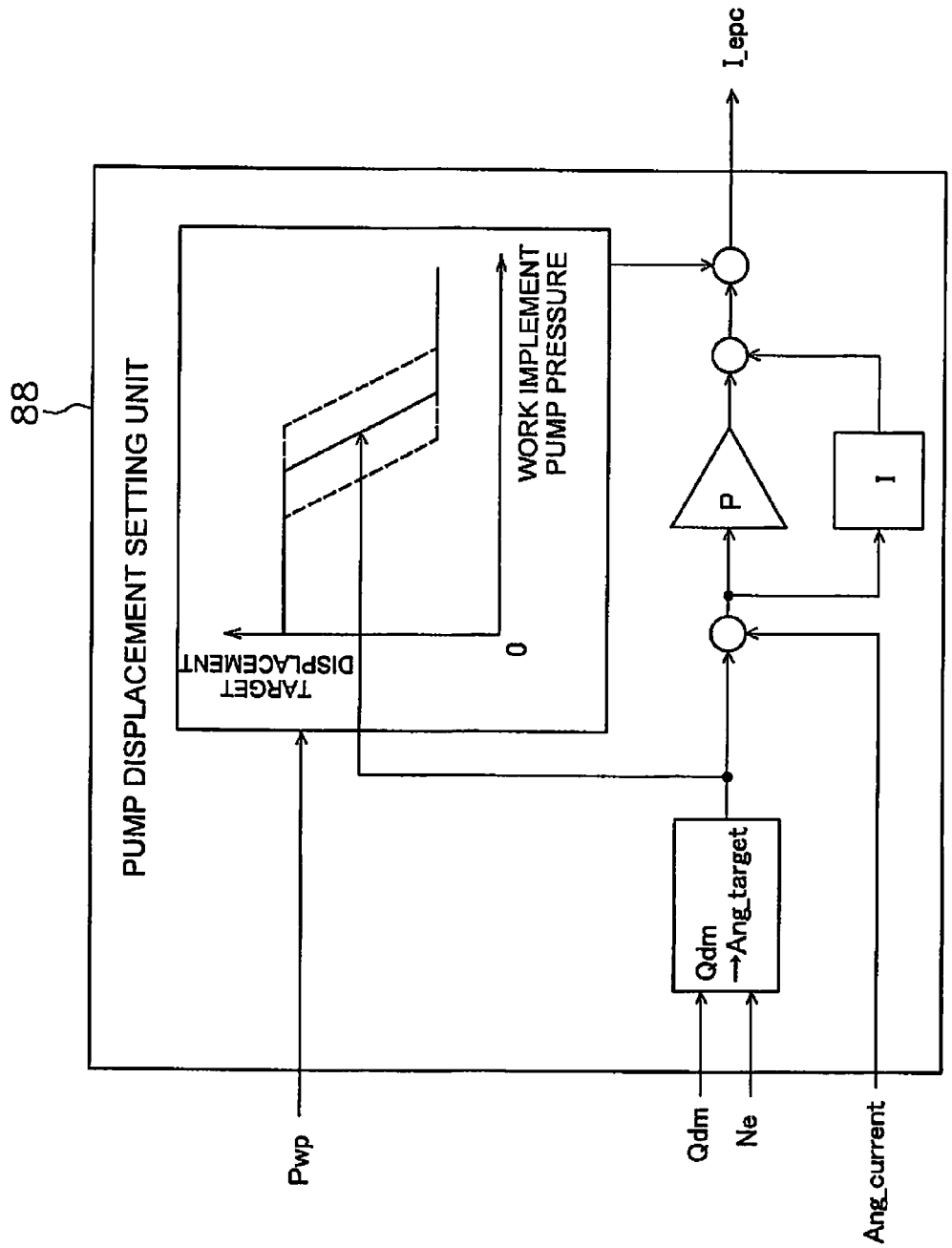
FIG. 13 is a control block diagram illustrating a process for establishing the command signal sent to a first displacement control device.

A method of establishing the command signals sent to the first displacement control device 42 is described next. FIG. 13 is a control block diagram illustrating a process for establishing the command signals sent to the first displacement control device 42. As illustrated in FIG. 13 the controller 27 includes a pump displacement setting unit 88. The pump displacement setting unit 88 determines a target displacement for the work implement pump 23 on the basis of the required flow rate Qdm. The target displacement for the work implement pump 23 corresponds to a target tilt angle Ang_target in the work implement pump 23.

More specifically, the pump displacement setting unit 88 determines the target tilt angle Ang_target of the work implement pump 23 on the basis of the required flow rate Qdm and the engine rotation speed Ne. Namely, the pump displacement setting unit 88 divides the required flow rate Qdm by the engine rotation speed Ne to compute a target displacement for the work implement pump 23, and determines the target tilt angle Ang_target of the work implement pump 23 from the target displacement. As above described, the PC valve 47 changes the relationship between the displacement of the work implement pump 23 and the work implement pump pressure Pwp in accordance with command signals from the controller 27. The pump displacement setting unit 88 determines a command value I_epc that is sent to the PC valve 47 which satisfies the relationship between a target displacement corresponding to the target tilt angle Ang_target, and the present work implement pump pressure Pwp. The command value I_epc is the command current value sent to the PC valve 47.

The pump displacement setting unit 88 determines the command signal I_epc through feedback control on the basis of the target tilt angle Ang_target for the work implement pump 23, and the actual tilt angle Ang_current detected by the first tilt-angle detector 33. The actual tilt angle Ang_current corresponds to the actual displacement of the work implement pump 23. In the embodiment, although PI control may be used as a feedback control method, other techniques of feedback control may be used.

Figure 14:
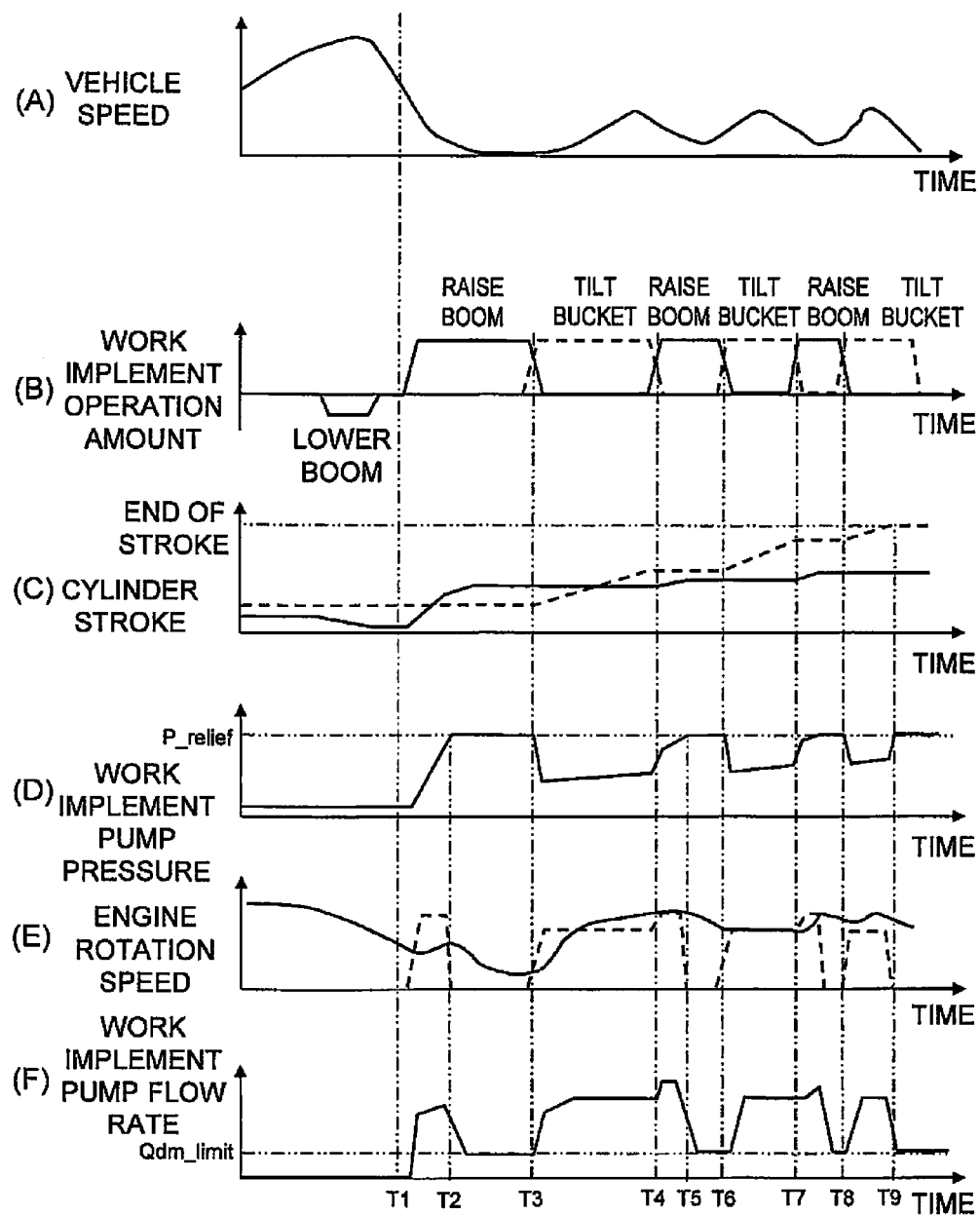
FIGS. 14A-14F includes timing charts illustrating examples of the variations in parameters used in limiting the relief flow rate.

FIGS. 14A-14F include timing charts illustrating examples of the variations in parameters used in limiting the relief flow rate. FIG. 14A illustrates the variation in the vehicle speed; FIG. 14B illustrates the variation in the work implement operation amount Awo. Specifically, the solid line in FIG. 14B represent the variations in the work implement operation amount Awo for the boom 11, and the dotted line represents the variations in the work implement operation amount Awo for the bucket 12. FIG. 14C illustrates the variations in the cylinder stroke of the hydraulic cylinder. Specifically, the solid line in FIG. 14C represents the variations in the cylinder stroke of the lift cylinder 13, and the dotted line represents the variations in the cylinder stroke of the bucket cylinder 14. FIG. 14D illustrates the variations in the work implement pump pressure. FIG. 14E illustrates the variations in the engine rotation speed. Specifically, the solid line in FIG. 14E represents the variations in the actual engine rotation speed detected by the engine rotation speed detector 31. The dotted line in FIG. 14E represents the variations in the engine rotation speed Nedm required by the work implement determined by the work implement requirement setting unit 86. FIG. 14F illustrates the variations in the discharge flow rate of the work implement pump 23.

As illustrated in FIGS. 14A-14F, once the bucket 12 enters a pile of earth, such as sand that is to be excavated (time T1), the boom 11 is lifted as illustrated in FIG. 14B (time T1 to T2). At this point the work implement pump pressure increases to coincide with the increased load on the boom 11 as illustrated in FIG. 14D. The actual engine rotation speed also increases as illustrated in FIG. 14E due to the increase in the engine rotation speed Nedm required by the work implement. Moreover, the discharge flow rate of the work implement pump 23 also increases as illustrated in FIG. 14F.

When a larger load is placed on the boom 11, the boom 11 stalls (does not rise) as illustrated in FIG. 14C (time T2 to T3) regardless of whether there is an operation to raise the boom 11. At this point, the work implement pump pressure increases to the relief pressure P_relief as illustrated in FIG. 14D, thereby causing the relief valve 48 to open. Hereby, the work implement pump pressure may be adjusted to not exceed the relief pressure P_relief. Additionally, limiting the relief flow rate can limit the discharge flow rate of the work implement pump 23 to the flow rate limit value Qdm_limit as illustrated in FIG. 14F.

Note that during time T2 to T3, the vehicle speed decreases and the work vehicle 1 hardly moves, i.e., is in travel stalled state as illustrated in FIG. 14A. In this case, the output rotation speed Nout decreases, and therefore the horsepower Hdm required from the engine decreases. Thus, because this causes the commanded throttle value Th_cm to decrease, the engine rotation speed decreases as illustrated in FIG. 14E. Thus, it is possible to improve the fuel efficiency of the work vehicle.

Similarly, the boom 11 is stalled (does not rise) during times T5 to T6, and times T7 to T8 as illustrated in FIG. 14C, regardless of whether the boom 11 is being raised. In this case as well, the work implement pump pressure reaches the relief pressure P_relief as illustrated in FIG. 14D, and as illustrated in FIG. 14F, limiting the relief flow rate limits the discharge flow rate from the work implement pump 23 to the flow rate limit value Qdm_limit.

Note that during times T5 to T6, and times T7 to T8 the work vehicle 1 travels at some vehicle speed as illustrated in FIG. 14A. Therefore, although the engine rotation speed increases, similarly to times T2 to T3, in this case the discharge flow rate of the work implement pump 23 is limited to the flow rate limit value Qdm_limit as illustrated in FIG. 14E.

Additionally, the bucket 12 is being tilted at time T3 to T4, time T6 to T7, and time T8 to T9. Namely, the operations to raise the boom 11 and to raise the bucket 12 are carried out alternately. The bucket 12 is subject to a smaller load compared to the load on the boom 11. Accordingly, the work implement pump pressure is smaller than the relief pressure P_relief as illustrated in FIG. 14D when raising the bucket 12. Thus, when raising the bucket 12, the limiting the relief flow rate may be canceled as illustrated in FIG. 14F so that the discharge flow rate of the work implement pump 23 increases. Note that as shown from time T9, limiting the relief flow rate is carried out even when the cylinder stroke reaches the end of stroke.

A work vehicle 1 according to the exemplary embodiment has the following features.

As shown from time T3 above described, the required traction force Tout is established as a large value when the work vehicle 1 is traveling and a large amount of drive power is required for travel. Hereby, the engine rotation speed may be highly maintained. Whereas, as shown at times T2 to T3, the output rotation speed Nout decreases when the work vehicle 1 is stopped, and therefore the horsepower Hdm required from the engine decreases. Thus, the engine rotation speed may be reduced. Consequently, it is possible to improve the fuel efficiency of the work vehicle.

During relief, the work implement requirement setting unit 86 sets the upper limit of the required flow rate Qdm to a prescribed flow rate limit value Qdm_limit to thereby reduce the discharge flow rate of the work implement pump 23 without depending on the engine rotation speed. Hereby, the work implement pump pressure Pwp and the discharge flow rate of the work implement pump 23 may be stably controlled during relief regardless of the engine rotation speed.

When the operator provides manipulating the work implement operation member 52a to a large extent, the engine rotation speed Nedm required by the work implement may be increased to increase the engine rotation speed. Thus, the operator may operate the work implement operation member 52a without depending on operation of the accelerator operation member 51a to adjust the speed of the work implement 3. Hereby the speed of the work implement 3 and the vehicle speed may be adjusted through a simple operation.

During relief, the upper limit of the required flow rate Qdm is limited to the flow rate limit value Qdm_limit. Therefore, energy losses can be suppressed even when the operator manipulates the work implement operation member 52a to a large extent. Additionally, a commanded throttle value Th_cm for the engine 21 is determined on the basis of the limited required flow rate Qdm; therefore, increases in the engine rotation speed may be controlled. Thus, it is possible to improve the fuel efficiency of the work vehicle.

When the work vehicle 1 is excavating, the work implement requirement setting unit 86 sets the flow rate limit value Qdm_limit to a second limit value Q_Hi2 during excavation which is larger than a second limit value Q_Hi1 during normal operation. Thus, the amount by which the discharge flow rate of the work implement pump 23 is reduced during relief may be kept smaller during excavation than the quantity by which the discharge flow rate is reduced during normal operation. Accordingly, the discharge flow rate may be promptly restored, even when the work implement 3 state changes frequently during excavation. Hereby the responsiveness of the work implement 3 may be improved.

The pump displacement setting unit 88 determines a target displacement for the work implement pump 23 on the basis of a required flow rate Qdm, and establishes a command signal sent to the first displacement control device 42 in accordance with the target displacement for the work implement pump 23. Therefore, a desired discharge flow rate may be obtained by controlling the displacement of work implement pump 23.

The command signal sent to the first displacement control device 42 is established through feedback control on the basis of a target tilt angle for the work implement pump 23 corresponding to a target displacement for the work implement pump 23, and an actual tilt angle. Namely the command signal sent to the first displacement control device 42 is established through feedback control on the basis of the actual tilt angle in the work implement pump 23 and a target displacement for the work implement pump 23. Therefore, the discharge flow rate of the work implement pump 23 may be more precisely controlled.

The present invention is not limited to the exemplary embodiment such as above described, and may be modified or revised in various ways without deviating from the scope of the invention.

The present invention is not limited to the above described wheel loader, and may be adopted in another type of work vehicle such as a bulldozer, a tractor, a forklift or a motor grader.

The present invention is not limited to an EMT and may be adopted in another type of speed change device such as an HMT. In this case, the first motor MG1 would function as a hydraulic motor and a hydraulic pump. The second motor MG2 would also functions as a hydraulic motor and a hydraulic pump. The first motor MG1 and the second motor MG2 are variable displacement pumps/motors where the controller 27 controls the tilt angle of the swashplate or the tilt axis to control the displacement thereof. Further the displacement of the first motor MG1 and the second motor MG2 may be controlled so that a commanded torqueTm1_ref, Tm2_ref computed identically as in the above-mentioned embodiment is output.

The configuration of the power transmission device 24 is not limited to the configuration in the above-mentioned exemplary embodiment. For instance, the linkages between and arrangements of each of the elements in the two planetary gear mechanisms 68, 69 are not limited to the linkages and arrangements in the above-mentioned embodiment. Additionally, the power transmission device 24 is not limited to being equipped with two planetary gear mechanisms. The power transmission device 24 may have only one planetary gear mechanism. Alternatively, the power transmission device 24 may have three or more planetary gear mechanisms.

The control of the power transmission device 24 is not limited to the control in the above-mentioned exemplary embodiment. In other words, in the above exemplary embodiment, a target input-shaft torque Te_ref and a target output-shaft torque To_ref are determined to obtain a prescribed vehicle speed—tractive force characteristics that the traction force continuously changes in accordance with the vehicle speed. However, the target input-shaft torque Te_ref and the target output-shaft torque To_ref may be established in any desired manner.

The torque balance information is not limited to an expression that balances the torque as in the above exemplary embodiment. For instance, the torque balance information may be in another format such as a table or a map.

The work vehicle is not limited to having one work implement pump; the work vehicle may be equipped with two or more work implement pumps. The above-described displacement becomes the total displacement of the plurality of work implement pumps.

Decreasing the traction force is not required when controlling the speed of the work implement 3 by controlling the engine rotation speed. Alternatively, decreasing the traction force is not limited to multiplying the vehicle speed ratio VR by a prescribed reduction rate. Other methods may be used.

The speed of the work implement 3 may be controlled by controlling the engine rotation speed before the work implement pump 23 reaches the maximum displacement.

In the above exemplary embodiment, the flow rate limit information D5 includes normal-operation limit information D5a and excavation-operation limit information D5b for limiting the relief flow rate; however, the flow rate limit information D5 may contain only one of the normal-operation limit information D5a and the excavation-operation limit information D5b.

In the above exemplary embodiment the command signal sent to the pump displacement control device was established through feedback control; however, the command signal sent to the pump displacement control device may be established without depending on feedback control.

Figure 15:
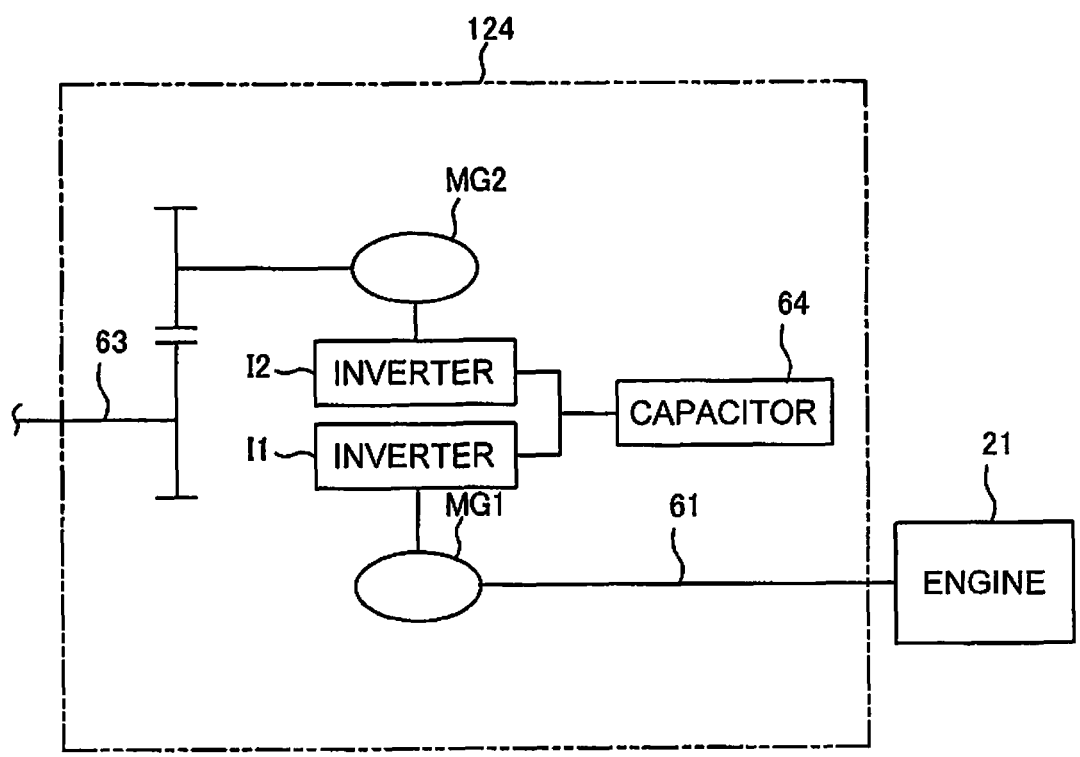
FIG. 15 is a schematic diagram illustrating a power transmission device according to a first modification example.

The power transmission device is not limited to a so-called split type device using the above-described kind of planetary gear mechanism. Other types of devices may be adopted. For instance, FIG. 15 is a schematic diagram illustrating a power transmission device 124 according to a first modification example. The power transmission device 124 illustrated FIG. 15 is a series type power transmission device. The engine 21 uses the first motor MG1 only for generating electric power in the power transmission device 124. The second motor MG2 uses the electrical power generated by the first motor MG1 to drive the travel device. Additionally, the second motor MG2 recovers energy during deceleration and the like to generate power.

Figure 16:
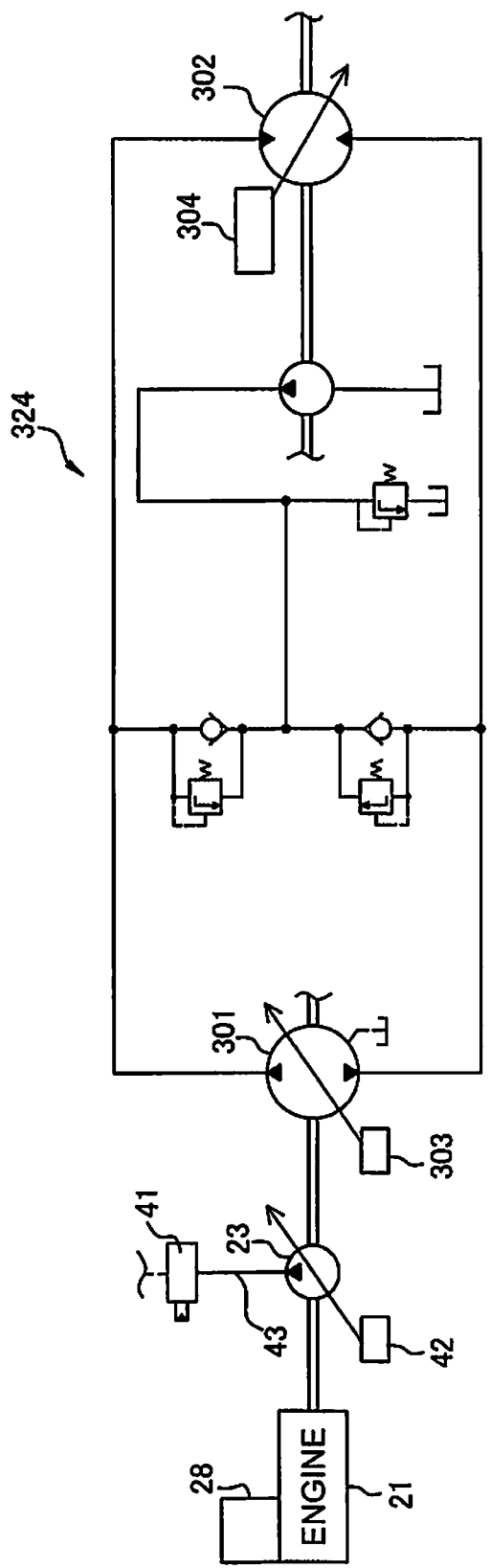
FIG. 16 is a schematic diagram illustrating a power transmission device according to a second modification example.

Alternatively, the power transmission device is not limited to a so-called hybrid type power transmission device which uses the above-described kinds of motors. For instance, FIG. 16 is a schematic diagram illustrating a power transmission device 324 according to a second modification example. The power transmission device 324 is a so-called Hydro Static Transmission (HST) device. The power transmission device 324 includes a travelling pump 301, and a travelling motor 302. The engine 21 drives the travelling pump 301. The travelling pump 301 is a variable displacement hydraulic pump. A pump displacement control device 303 controls the displacement of the travelling pump 301. The travelling motor 302 is driven by the hydraulic fluid discharged from the travelling pump 301 to thereby drive the travel device. The travelling motor 302 is a variable displacement hydraulic motor. A motor displacement control device 304 controls the displacement of the travelling motor 302. Controlling the engine rotation speed, the displacement of the travelling pump 301, the displacement of the travelling motor 302, and the like controls the vehicle speed and the traction force.

In FIGS. 15 and 16 the elements with a configuration identical to the above-described exemplary embodiment are given the same reference numerals, and a description of the configurations are omitted.

According to the exemplary embodiments of the present invention, a work vehicle and a control method therefor can stably control the discharge pressure and the discharge flow rate of a hydraulic pump during relief regardless of the engine rotation speed.

The invention claimed is:
1. A work vehicle comprising:
an engine;

a variable displacement hydraulic pump driven by the engine;
a work implement driven by hydraulic fluid discharged from the hydraulic pump;
a pump displacement control device for controlling the displacement of the hydraulic pump;
a pump pressure detector for detecting a discharge pressure from the hydraulic pump;
a relief valve which opens when the discharge pressure from the hydraulic pump reaches or exceeds a prescribed relief pressure;
a travel device allowing the vehicle to travel;
a power transmission device into which drive power from the engine enters so that the power transmission device outputs the drive power for driving the travel device;
an accelerator operation member;
a work implement operation member; and
a controller for controlling the power transmission device;
the controller including
 a transmission requirement setting unit for setting a required traction force that is a target traction force for the travel device on the basis of an amount the accelerator operation member is operated;
 a work implement requirement setting unit for setting a required flow rate that is a target flow rate in the work implement on the basis of an amount the work implement operation member is operated;
 an engine requirement setting unit for determining a horsepower required from the engine on the basis of a horsepower required by the transmission and a horsepower required by the work implement, the horsepower required by the transmission being set on the basis of the required traction force and the horsepower required by the work implement being set on the basis of the required flow rate;
 a required throttle setting unit for setting a commanded throttle value sent to the engine on the basis of the horsepower required from the engine; and
 a pump displacement setting unit for setting a target displacement for the hydraulic pump on the basis of the required flow rate; and
 the work implement requirement setting unit setting an upper limit for the required flow rate to a prescribed flow rate limit value when the discharge pressure of the hydraulic pump is at or above a prescribed pressure threshold.

2. The work vehicle according to claim 1, wherein
the work implement requirement setting unit sets an engine rotation speed required by the work implement on the basis of the required flow rate and the displacement of the hydraulic pump;
the required throttle setting unit sets a first throttle value on the basis of the horsepower required from the engine;
the required throttle setting unit sets a second throttle value on the basis of the engine rotation speed required by the work implement; and
the required throttle setting unit sets the larger of the first throttle value and the second throttle value as a commanded throttle value sent to the engine.

3. The work vehicle according to claim 2, further comprising
an engine rotation speed detector for detecting an engine rotation speed; and
the pump displacement setting unit setting the target displacement for the hydraulic pump on the basis of the required flow rate and the engine rotation speed.

4. The work vehicle according to claim 3, wherein
the work implement requirement setting unit increases the prescribed flow rate limit value when the vehicle is excavating.

5. The work vehicle according to claim 4, wherein
the pump displacement control device changes the displacement of the hydraulic pump in accordance with a command signal entered into the pump displacement control device; and
the pump displacement setting unit establishes a command signal sent to the pump displacement control device in accordance with the target displacement for the hydraulic pump.

6. The work vehicle according to claim 5, further comprising
a tilt-angle detector for detecting a tilt angle of the hydraulic pump; and
the pump displacement setting unit establishing the command signal sent to the pump displacement control device through feedback control on the basis of an actual displacement of the hydraulic pump corresponding to the tilt angle of the hydraulic pump and the target displacement for the hydraulic pump.

7. The work vehicle according to claim 6, wherein the power transmission device further includes
an input shaft, an output shaft, and a motor; and
the power transmission device being configured so that varying a rotation speed of the motor varies a rotation speed ratio of the output shaft to the input shaft.

8. The work vehicle according to claim 1, further comprising
an engine rotation speed detector for detecting an engine rotation speed; and
the pump displacement setting unit setting the target displacement for the hydraulic pump on the basis of the required flow rate and the engine rotation speed.

9. The work vehicle according to claim 1, wherein
the work implement requirement setting unit increases the prescribed flow rate limit value when the vehicle is excavating.

10. The work vehicle according to claim 1, wherein
the pump displacement control device changes the displacement of the hydraulic pump in accordance with a command signal entered into the pump displacement control device; and
the pump displacement setting unit establishes a command signal sent to the pump displacement control device in accordance with the target displacement for the hydraulic pump.

11. The work vehicle according to claim 10, further comprising
a tilt-angle detector for detecting a tilt angle of the hydraulic pump; and
the pump displacement setting unit the command signal sent to the pump displacement control device through feedback control on the basis of an actual displacement of the hydraulic pump corresponding to the tilt angle of the hydraulic pump and the target displacement for the hydraulic pump.

12. The work vehicle according to claim 1, wherein the power transmission device further includes
an input shaft, an output shaft, and a motor; and
the power transmission device being configured so that varying a rotation speed of the motor varies a rotation speed ratio of the output shaft to the input shaft.

13. A control method for a work vehicle equipped with an engine, a variable displacement hydraulic pump driven by the engine, a work implement driven by hydraulic fluid discharged from the hydraulic pump, a pump displacement control device for controlling the displacement of the hydraulic pump, a pump pressure detector for detecting a discharge pressure from the hydraulic pump, a relief valve which opens when the discharge pressure from the hydraulic pump reaches or exceeds a prescribed relief pressure, a travel device allowing the vehicle to travel, a power transmission device into which drive power from the engine enters so that the power transmission device outputs the drive power for driving the travel device, an accelerator operation member, and a work implement operation member, the control method comprising the steps of:

setting a required traction force that is a target traction force for the travel device on the basis of an amount the accelerator operation member is operated;

setting a required flow rate that is a target flow rate in the work implement on the basis of an amount the work implement operation member is operated;

determining a horsepower required from the engine on the basis of a horsepower required by the transmission and a horsepower required by the work implement, the horsepower required by the transmission being set on the basis of the required traction force and the horsepower required by the work implement being set on the basis of the required flow rate;

setting a commanded throttle value sent to the engine on the basis of the horsepower required from the engine; and setting a target displacement for the hydraulic pump on the basis of the required flow rate; and when setting the required flow rate, setting an upper limit therefor to a prescribed flow rate limit value when the discharge pressure of the hydraulic pump is at or above a prescribed pressure threshold.

* * * * *